US012763873B2

(12) United States Patent
You et al.

(10) Patent No.: US 12,763,873 B2
(45) Date of Patent: Oct. 13, 2026

(54) METHOD FOR OPERATING TERMINAL IN WIRELESS COMMUNICATION SYSTEM, AND DEVICE USING SAME METHOD

(71) Applicant: LG ELECTRONICS INC., Seoul (KR)

(72) Inventors: Hyangsun You, Seoul (KR); Kijun Kim, Seoul (KR); Hyunsoo Ko, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 333 days.

(21) Appl. No.: 18/291,376

(22) PCT Filed: Aug. 5, 2022

(86) PCT No.: PCT/KR2022/011679

§ 371 (c)(1),
(2) Date: Jan. 23, 2024

(87) PCT Pub. No.: WO2023/014178

PCT Pub. Date: Feb. 9, 2023

(65) Prior Publication Data

US 2025/0007642 A1 Jan. 2, 2025

(30) Foreign Application Priority Data

Aug. 6, 2021 (KR) ........................ 10-2021-0104103

(51) Int. Cl.
*H04L 5/14* (2006.01)
*H04L 1/00* (2006.01)
(Continued)

(52) U.S. Cl.
CPC .............. *H04L 1/0025* (2013.01); *H04L 5/14* (2013.01); *H04W 72/0446* (2013.01); *H04W 76/20* (2018.02)

(58) Field of Classification Search
CPC . H04L 1/0025; H04L 5/14; H04L 5/00; H04L 5/001; H04L 5/0092; H04L 5/0094;
(Continued)

(56) References Cited

U.S. PATENT DOCUMENTS

2019/0261406 A1* 8/2019 Kim .................... H04L 27/2666
2021/0127401 A1* 4/2021 Jiang ........................ H04L 5/001
2022/0014342 A1* 1/2022 Abotabl ................ H04L 5/1423

FOREIGN PATENT DOCUMENTS

EP 4013133 * 6/2022
WO 2021-027887 2/2021

OTHER PUBLICATIONS

European Patent Office Application Serial No. 22853553.0, Search Report dated May 7, 2025, 11 pages.
(Continued)

*Primary Examiner* — Abdullahi E Salad
(74) *Attorney, Agent, or Firm* — LEE, HONG, DEGERMAN, KANG & WAIMEY

(57) ABSTRACT

A device and a method for operating a device in a wireless communication system are provided. The device may be a terminal, a chipset, or a base station. The base station may inform the terminal of a first time resource operating in half duplex and a second time resource operating in full duplex. In addition, a first bandwidth part (BWP) set in which the terminal operates in the first time resource and a second BWP set in which the terminal operates in the second time resource may also be informed. When switching between the first time resource and the second time resource occurs, the terminal can operate in the corresponding BWP without additional signaling indicating a BWP change.

8 Claims, 25 Drawing Sheets

(51) Int. Cl.
*H04W 72/0446* (2023.01)
*H04W 76/20* (2018.01)

(58) Field of Classification Search
CPC ............ H04L 5/1469; H04W 72/0446; H04W 76/20; H04W 72/0453
See application file for complete search history.

(56) References Cited

OTHER PUBLICATIONS

Lenovo et al., "Full Duplex Cell Operation in NR," RWS-210397, 3GPP TSG RAN Rel-18 workshop, Electronic Meeting, Jun. 2021, 5 pages.
CMCC, "New study on full duplex for NR," RWS-210352, 3GPP TSG RAN Rel-18 workshop, Electronic Meeting, Jun. 2021, 5 pages.
PCT International Application No. PCT/KR2022/011679, International Search Report dated Nov. 11, 2022, 3 pages.
Qualcomm Incorporated, "Type-A HD-FDD for RedCap UE," R1-2103176, 3GPP TSG-RAN WG1 Meeting #104b, e-Meeting, Apr. 2021, 11 pages.
Qualcomm Incorporated, "Type-A Half-duplex FDD switching time for RedCap UE," R4-2107340, 3GPP TSG-RAN WG4 Meeting #98bis-e, Electronic Meeting, Apr. 2021, 4 pages.
ZTE Corporation (Rapporteur), "Introduction of SDT," R2-2107478, 3GPP TSG-RAN WG2 Meeting #115e, Electronic, Aug. 2021, 931 pages.
Samsung, "HD-FDD Operation for RedCap UEs," R1-2103248, 3GPP TSG RAN WG1#104b-e, e-Meeting, Apr. 2021, 8 pages.
ZTE, "HD-FDD for reduced capability NR devices," R1-2102856, 3GPP TSG RAN WG1 #104bis-e, e-Meeting, Apr. 2021, 8 pages.

* cited by examiner (a)

Carrier #0
Subband-wise Full Duplex (b)

Carrier #0
Spectrum-Sharing Full Duplex (a)

(b)

(a)

(b)

(a)

(b)

METHOD FOR OPERATING TERMINAL IN WIRELESS COMMUNICATION SYSTEM, AND DEVICE USING SAME METHOD

CROSS-REFERENCE TO RELATED APPLICATION(S)

This application is the National Stage filing under 35 U.S.C. 371 of International Application No. PCT/KR2022/011679, filed on Aug. 5, 2022, which claims the benefit of earlier filing date and right of priority to Korean Application No. 10-2021-0104103, filed on Aug. 6, 2021, the contents of which are all hereby incorporated by reference herein in their entireties.

TECHNICAL FIELD

This disclosure relates to a method of operating a user equipment (UE) in a wireless communication system and an apparatus using the method.

BACKGROUND

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mITC), ultra-reliable and low latency communication (URLLC) is discussed. This new technology may be called new radio access technology (new RAT or NR) in the present disclosure for convenience.

In NR, the base station can operate in half duplex (HD) or full duplex (FD) depending on time resources. The UE may need to apply different bandwidth parts (BWP) to the time resources in which the base station operates in HD and the time resources in which the base station operates in FD. Conventionally, the BWP in operation of the UE was informed through DCI (downlink control information). In this case, when the base station frequently switches between time resources operating in HD and time resources operating in FD, there is a problem in that BWP change instructions through the DCI also occur frequently.

SUMMARY

The technical problem that the present disclosure aims to solve is to provide a method of operating a UE in a wireless communication system and an apparatus that uses the method.

In one aspect, provided is a method of operating a UE in a wireless communication system. The method includes receiving a first message determining a cell-specific uplink-downlink time division duplex (TDD) configuration, receiving a second message determining a UE-specific uplink-downlink time division duplex (TDD) configuration, receiving, via at least one of the first message and the second message, first time resource information and second time resource information, the first time resource information informing a first time resource for which a base station is operating in half duplex (HD) and the second time resource information informing a second time resource for which the base station is operating in full duplex (FD), receiving first bandwidth part (BWP) information informing a first BWP set and second BWP information informing a second BWP set, the first BWP set including a first downlink (DL) BWP and a first uplink (UL) BWP, and the second BWP set including a second DL BWP and a second UL BWP, determining, based on at least one of the first time resource information and the second time resource information, whether a specific time resource corresponds to the first time resource or the second time resource, based on the specific time resource corresponding to the first time resource, communicating with the base station using the first BWP set, and based on the specific time resource corresponding to the second time resource, communicating with the base station using the second BWP set.

In another aspect, provided is a user equipment (UE). The UE includes a transceiver, at least one memory and at least one processor operably coupled to the at least one memory and the transceiver. The processor performs the above-described UE operation method.

In still another aspect, provided is an apparatus of a UE. The apparatus includes at least one memory and at least one processor operably coupled to the at least one memory. The processor performs the above-described UE operation method.

In still another aspect, provided is at least one computer readable medium (CRM) having instructions to be executed by at least one processor. The CRM performs each step of the above-described UE operation method.

In still another aspect, provided is a method of operating a base station in a wireless communication system. The method includes transmitting a first message determining a cell-specific uplink-downlink time division duplex (TDD) configuration and a second message determining a UE-specific uplink-downlink time division duplex (TDD) configuration to the UE, transmitting, via at least one of the first message and the second message, first time resource information and second time resource information, the first time resource information informing a first time resource for which a base station is operating in half duplex (HD) and the second time resource information informing a second time resource for which the base station is operating in full duplex (FD), transmitting first bandwidth part (BWP) information informing a first BWP set and second BWP information informing a second BWP set, the first BWP set including a first downlink (DL) BWP and a first uplink (UL) BWP, and the second BWP set including a second DL BWP and a second UL BWP, based on a specific time resource corresponding to the first time resource, communicating with a user equipment (UE) using the first BWP set, and based on the specific time resource corresponding to the second time resource, communicating with the UE using the second BWP set.

In still another aspect, provided is a base station (BS). The BS includes a transceiver, at least one memory and at least one processor operably coupled to the at least one memory and the transceiver. The processor performs the above-described base station operating method.

The UE can efficiently apply different BWPs to transmit and receive in time resources where the base station is operating in HD and in time resources where the base station is operating in FD.

Even if the base station frequently switches between HD time resources and FD time resources, the signaling overhead between the base station and the UE can be reduced and unnecessary delays can be avoided.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

Figure 1:
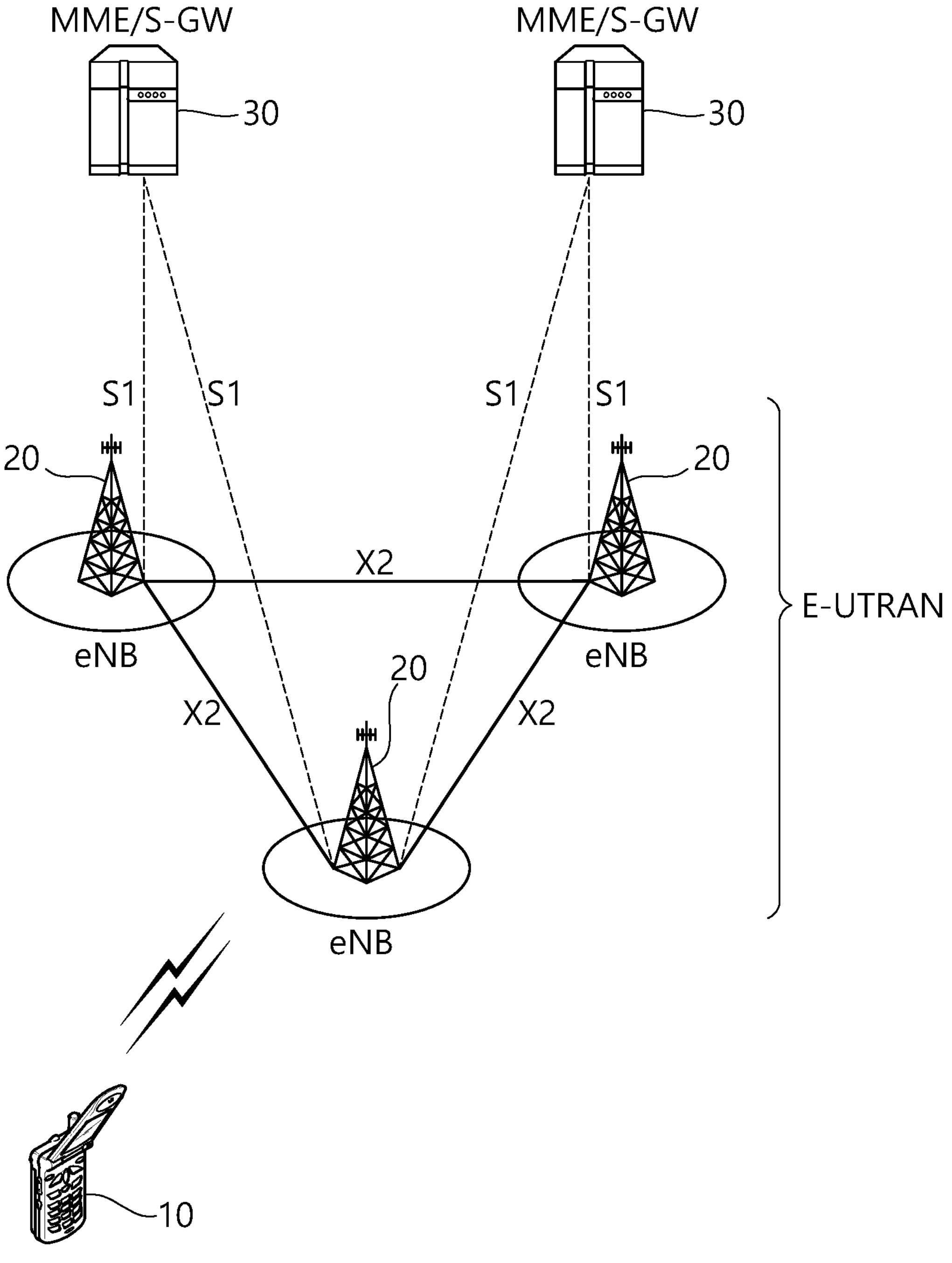
FIG. 1 illustrates a wireless communication system to which the present disclosure can be applied.

FIG. 1 illustrates a wireless communication system to which the present disclosure can be applied. This may also be called E-UTRAN (Evolved-UMTS Terrestrial Radio Access Network), or LTE (Long Term Evolution)/LTE-A system.

The E-UTRAN includes a base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, terminal etc. The BS 20 is generally a fixed station that communicates with the UE 10 and may be referred to as another terminology, such as an evolved node-B (eNB), a base transceiver system (BTS), an access point, etc.

The BSs are interconnected by means of an X2 interface. The BSs are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
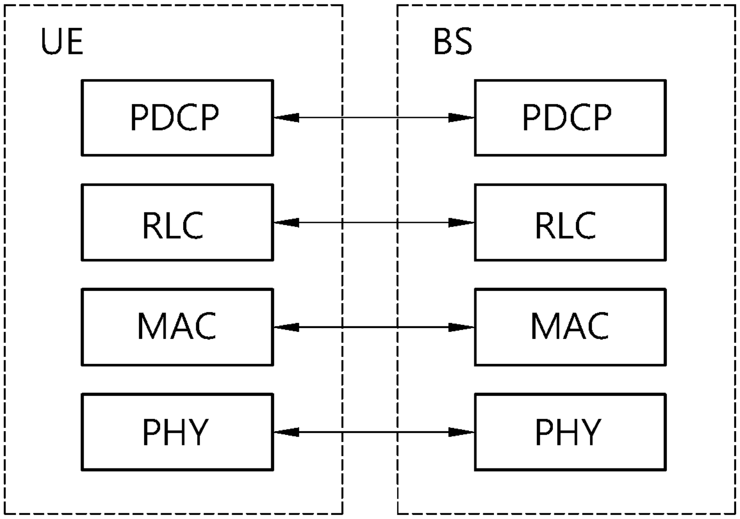
FIG. 2 is a block diagram showing the radio protocol architecture for the user plane.
Figure 3:
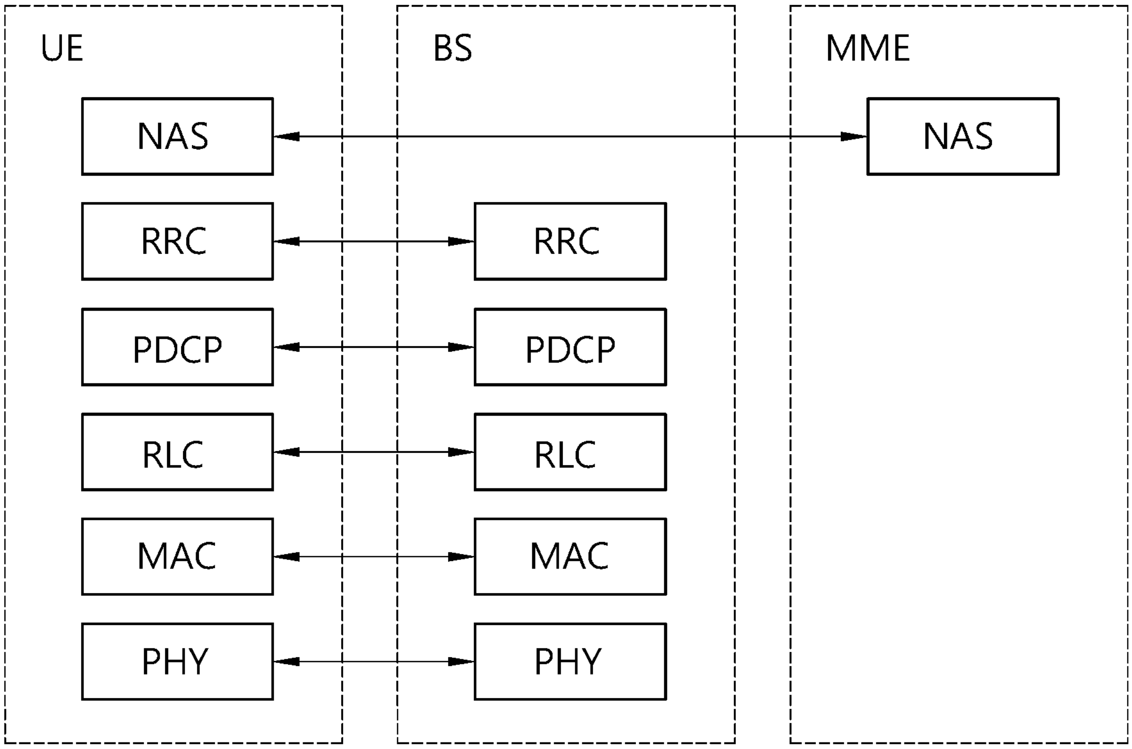
FIG. 3 is a block diagram showing the radio protocol structure for the control plane.

FIG. 2 is a block diagram showing the radio protocol architecture for the user plane. FIG. 3 is a block diagram showing the radio protocol structure for the control plane.

The user plane is a protocol stack for user data transmission. The control plane is a protocol stack for control signal transmission.

Referring to FIG. 2 and FIG. 3, a PHY layer provides an upper layer (=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PH—Y layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new RAT or NR in the present disclosure for convenience.

Figure 4:
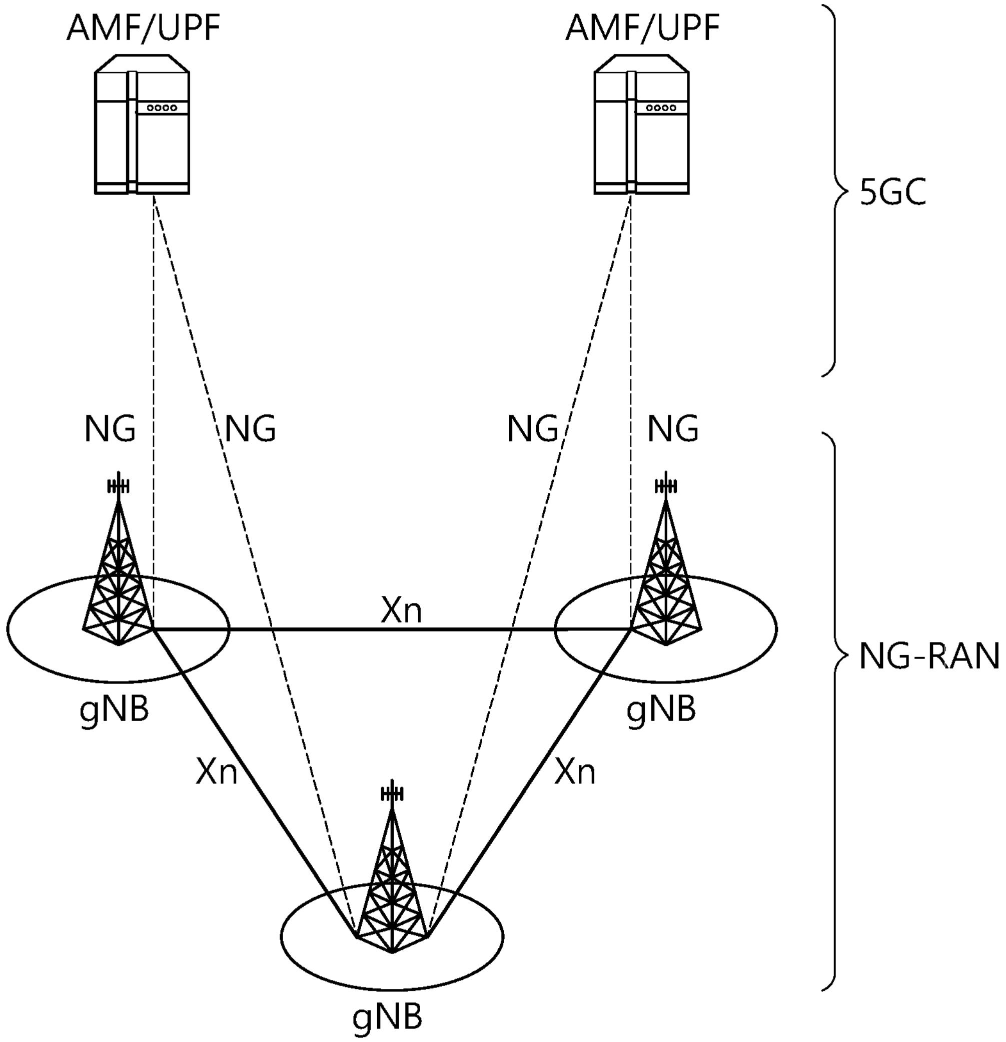
FIG. 4 illustrates the system structure of a next-generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a UE. FIG. 4 illustrates the case of including only gNBs. The gNBs(eNBs) are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
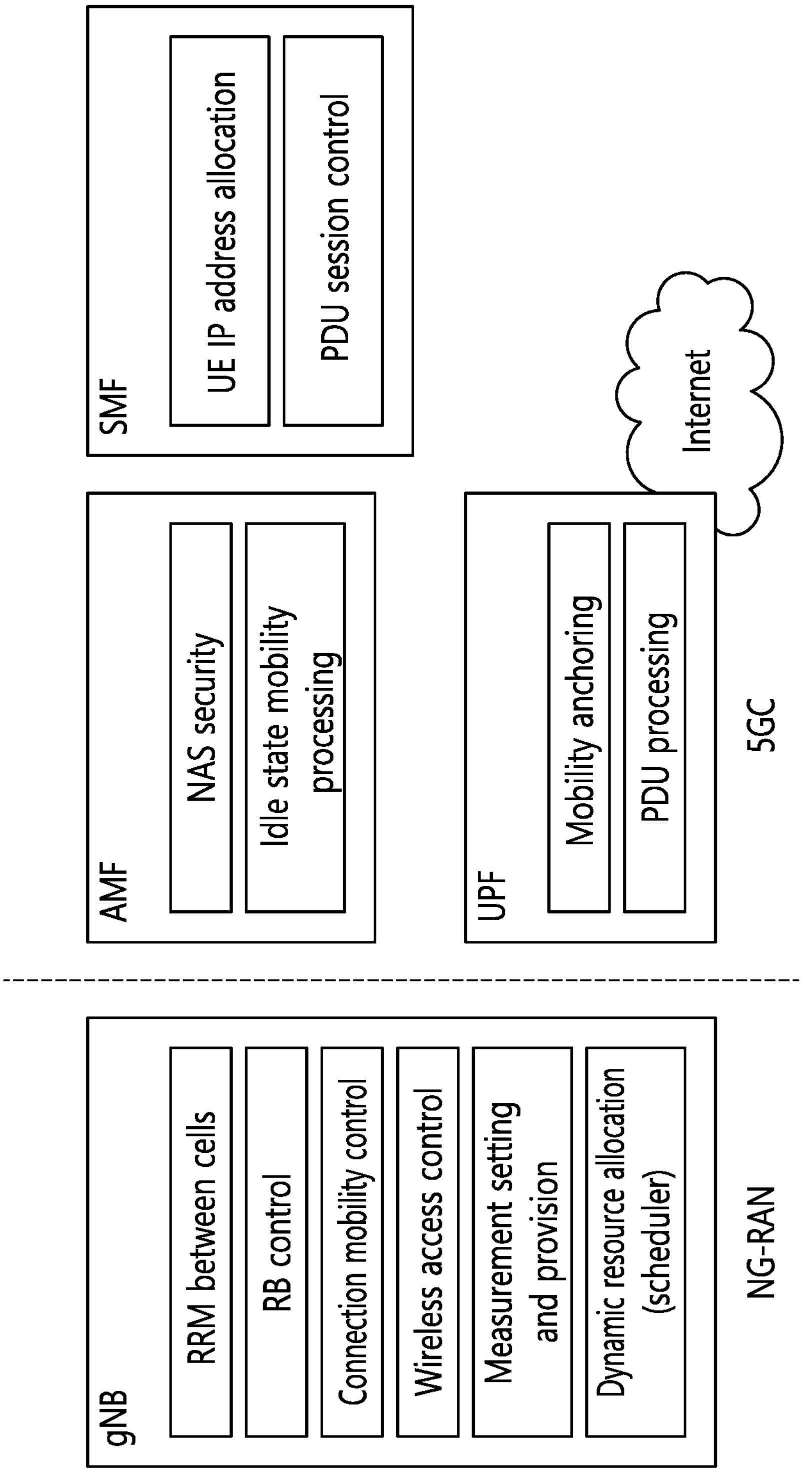
FIG. 5 illustrates the functional division between NG-RAN and 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
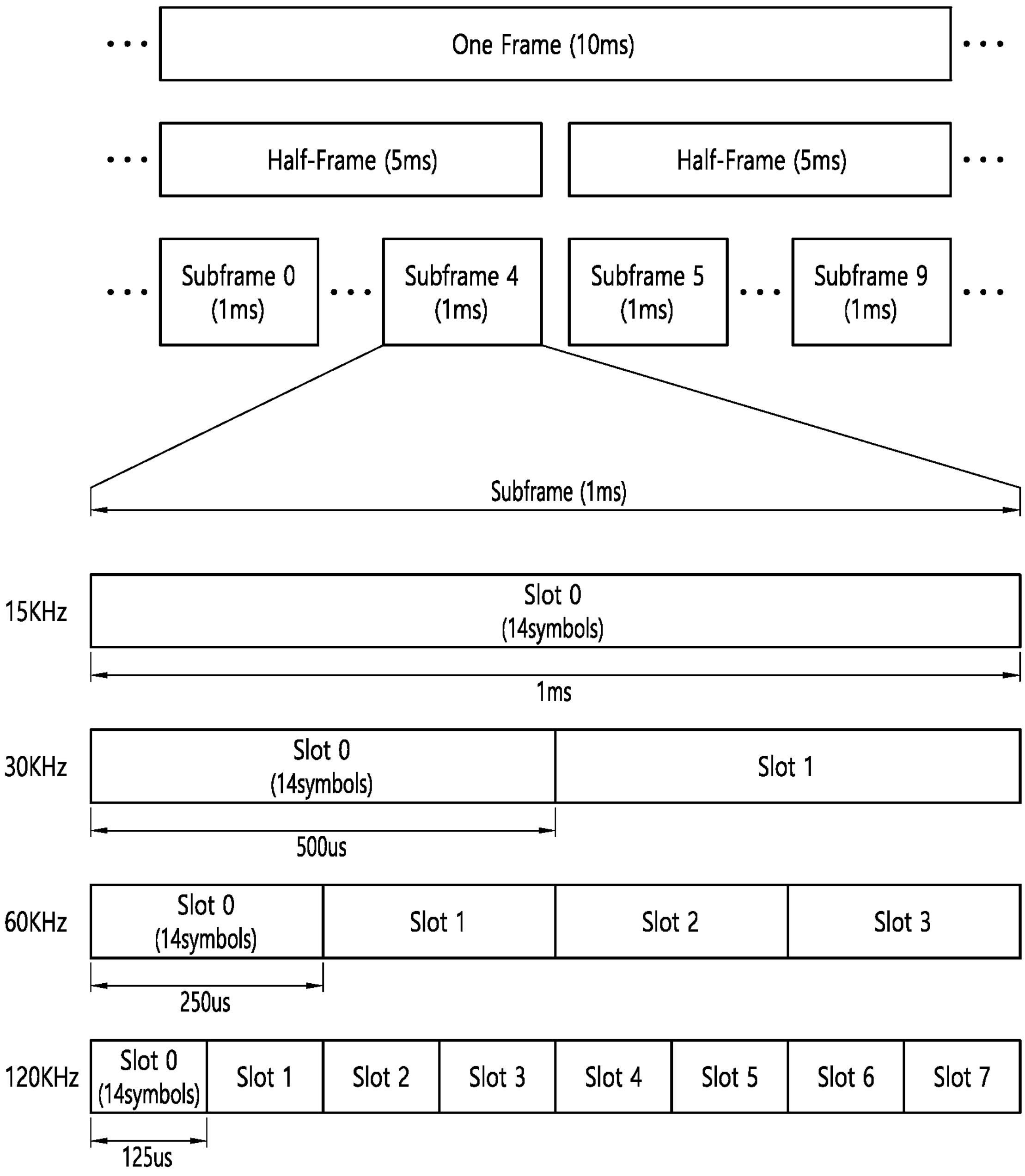
FIG. 6 illustrates a frame structure that can be applied in NR.

FIG. 6 illustrates an example of a frame structure that may be applied in NR.

Referring to FIG. 6, in the NR, a radio frame (hereinafter, also referred to as a frame) may be used in uplink and downlink transmissions. The frame has a length of 10 ms, and may be defined as two 5 ms half-frames (HFs). The HF may be defined as five 1 ms subframes (SFs). The SF may be divided into one or more slots, and the number of slots within the SF depends on a subcarrier spacing (SCS). Each slot includes 12 or 14 OFDM(A) symbols according to a cyclic prefix (CP). In case of using a normal CP, each slot includes 14 symbols. In case of using an extended CP, each slot includes 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

The following table 1 illustrates a subcarrier spacing configuration p.

TABLE 1

| μ | $\Delta f = 2^{\mu} \cdot 15$[kHz] | Cyclic prefix |
|---|---|---|
| 0 | 15 | Normal |
| 1 | 30 | Normal |
| 2 | 60 | Normal<br>Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations p.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 illustrates a case of μ=0, 1, 2, 3.

Table 2-1 below illustrates that the number of symbols per slot, the number of slots per frame, and the number of slots per subframe vary depending on the SCS, in case of using an extended CP.

TABLE 2-1

| μ | $N^{slot}_{symb}$ | $N^{frame,\mu}_{slot}$ | $N^{subframe,\mu}_{slot}$ |
|---|---|---|---|
| 2 | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
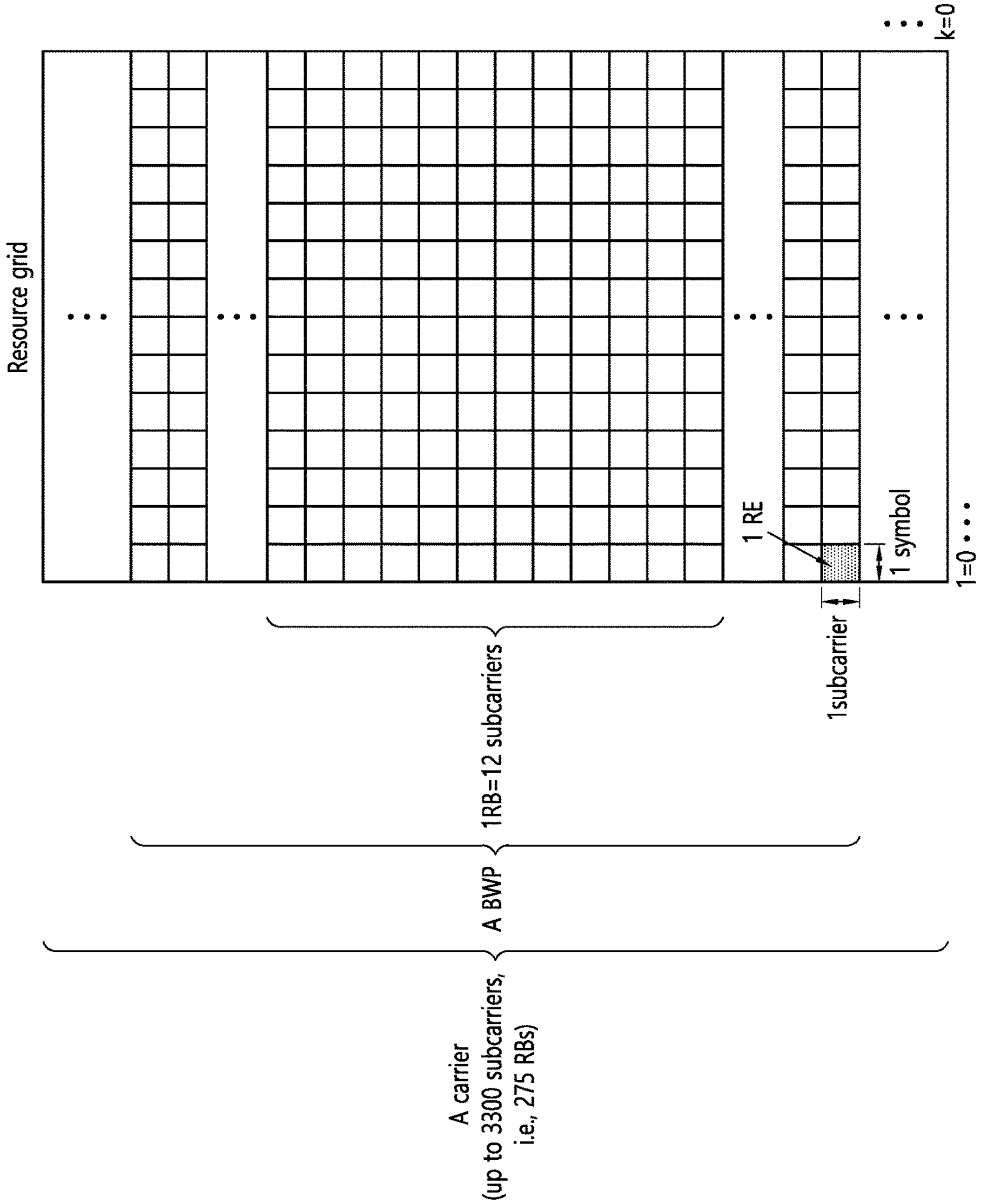
FIG. 7 illustrates the slot structure of an NR frame.

FIG. 7 illustrates a slot structure of an NR frame.

A slot may include a plurality of symbols in a time domain. For example, in case of a normal CP, one slot may include 7 symbols. However, in case of an extended CP, one slot may include 6 symbols. A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and so on). The carrier may include up to N (e.g., 5) BWPs. Data communication may be performed via an active BWP, and only one BWP may be activated for one UE. In a resource grid, each element may be referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring implies decoding of each PDCCH candidate according to a downlink control information (DCI) format. The UE monitors a set of PDCCH candidates in one or more CORESETs (to be described below) on an active DL BWP of each activated serving cell in which PDCCH monitoring is configured, according to a corresponding search space set.

A new unit called a control resource set (CORESET) may be introduced in the NR. The UE may receive a PDCCH in the CORESET.

Figure 8:
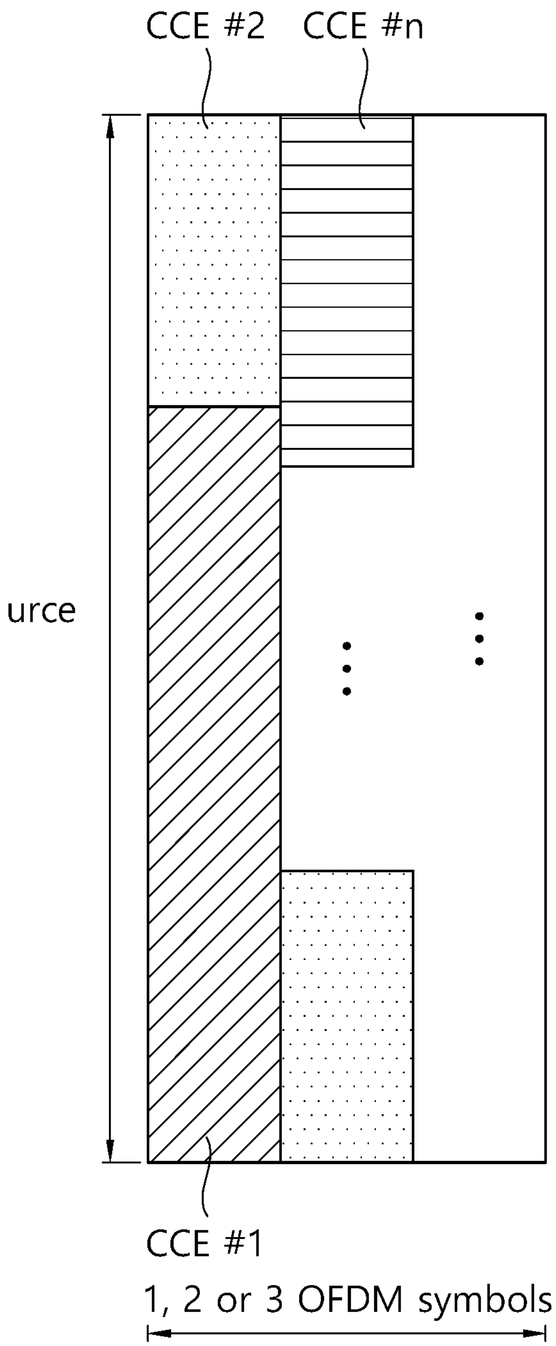
FIG. 8 illustrates the CORESET.

FIG. 8 illustrates CORESET.

Referring to FIG. 8, the CORESET includes $N^{CORESET}_{RB}$ number of resource blocks in the frequency domain, and $N^{CORSET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

A control region in the related art wireless communication system (e.g., LTE/LTE-A) is configured over the entire system band used by a base station (BS). All the UEs, excluding some (e.g., eMTC/NB-IoT UE) supporting only a narrow band, shall be able to receive wireless signals of the entire system band of the BS in order to properly receive/decode control information transmitted by the BS.

On the other hand, in NR, CORESET described above was introduced. CORESET is radio resources for control information to be received by the UE and may use only a portion, rather than the entirety of the system bandwidth. The BS may allocate the CORESET to each UE and may transmit control information through the allocated CORESET. In the NR, the UE may receive control information from the BS, without necessarily receiving the entire system band.

The CORESET may include a UE-specific CORESET for transmitting UE-specific control information and a common CORESET for transmitting control information common to all UEs.

On the other hand, NR may require high reliability depending on the application field. In this situation, the target block error rate (BLER) for downlink control information (DCI) transmitted through a downlink control channel (e.g., physical downlink control channel: PDCCH) may be significantly lower than that of the prior art. As an example of a method to satisfy the requirement for such high reliability, the amount of content included in DCI can be reduced and/or the amount of resources used when transmitting DCI can be increased. At this time, the resources may include at least one of resources in the time domain, resources in the frequency domain, resources in the code domain, and resources in the spatial domain.

In NR, the following technologies/features can be applied.

<Self-Contained Subframe Structure>

Figure 9:
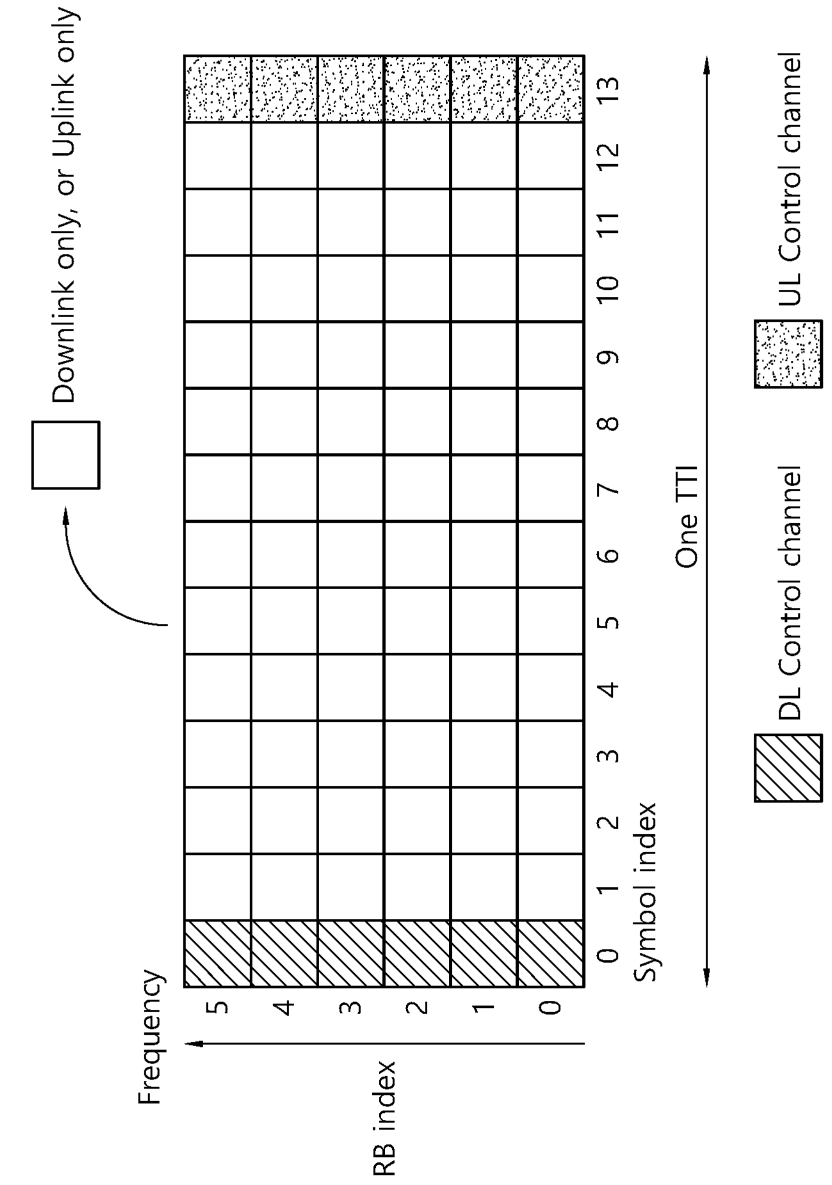
FIG. 9 shows an example of a frame structure for a new wireless access technology.

FIG. 9 shows an example of a frame structure for a new wireless access technology.

In NR, as shown in FIG. 9, a structure in which a control channel and a data channel are time-division-multiplexed within one TTI can be considered as a frame structure in order to minimize latency.

In FIG. 9, the hatched area represents the downlink control area, and the black portion represents the uplink control area. An unmarked area may be used for transmitting downlink data (DL data) or may be used for transmitting uplink data (UL data). The characteristic of this structure is that downlink (DL) transmission and uplink (UL) transmission proceed sequentially within one subframe, DL data can be sent within a subframe and UL ACK/NACK (Acknowledgement/Not-acknowledgement) can also be received. As a result, the time it takes to retransmit data when a data transmission error occurs is reduced, thereby minimizing the latency of final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 10:
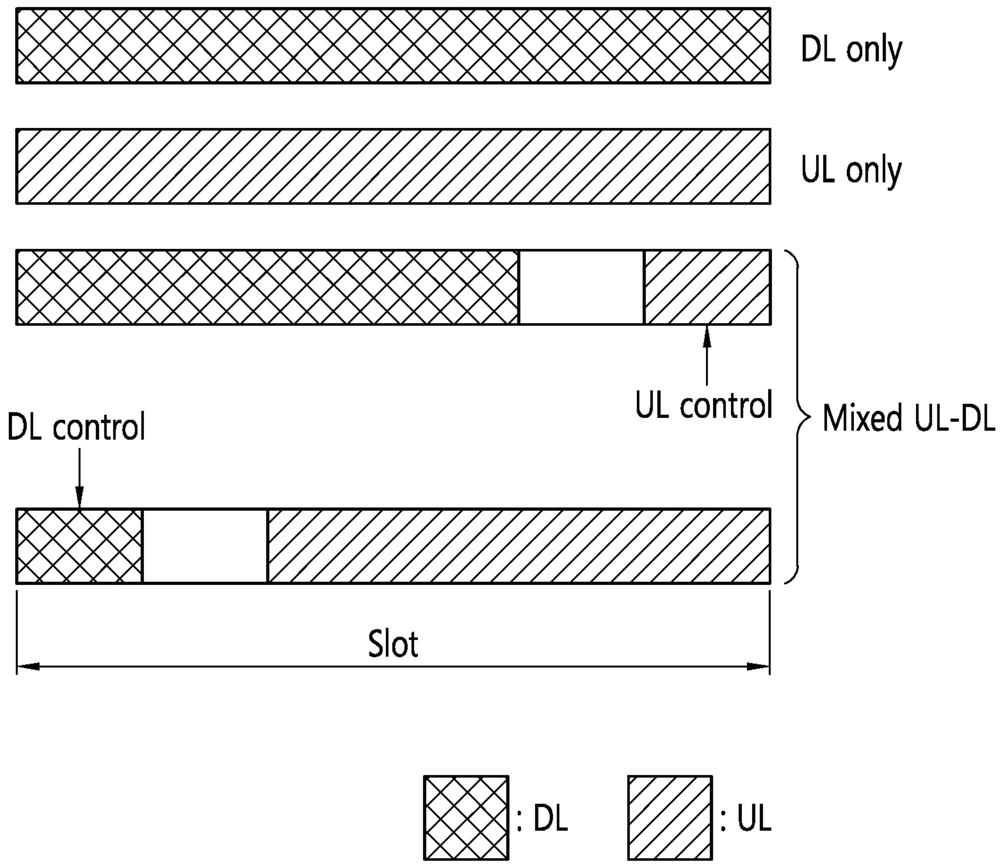
FIG. 10 illustrates the structure of a self-contained slot.

FIG. 10 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration,
2. UL only configuration,
3. Mixed UL-DL configuration:

DL region+Guard period (GP)+UL control region,

DL control region+GP+UL region.

DL region: (i) DL data region, (ii) DL control region+DL data region.

UL region: (i) UL data region, (ii) UL data region+UL control region.

A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

System information of the NR system may be transmitted in a broadcasting manner. In this case, in one symbol, analog beams belonging to different antenna panels may be simultaneously transmitted. A scheme of introducing a beam RS (BRS) which is a reference signal (RS) transmitted by applying a single analog beam (corresponding to a specific antenna panel) is under discussion to measure a channel per analog beam. The BRS may be defined for a plurality of antenna ports, and each antenna port of the BRS may correspond to a single analog beam. In this case, unlike the BRS, a synchronization signal or an xPBCH may be transmitted by applying all analog beams within an analog beam group so as to be correctly received by any UE.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a PBCH associated with a primary synchronization signal (PSS), secondary synchronization signal (SSS), and demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, beams may be used for transmission and reception. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.

1) CORESET index p (one of 0 to 11, where index of each CORESET may be determined uniquely among BWPs of one serving cell),
2) PDCCH DM-RS scrambling sequence initialization value,
3) Duration of a CORESET in the time domain (which may be given in symbol units),
4) Resource block set,
5) CCE-to-REG mapping parameter,
6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'),
7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 4).

TABLE 4

| QCL Type | Description |
|---|---|
| QCL-TypeA | Doppler shift, Doppler spread, Average delay, Delay spread |
| QCL-TypeB | Doppler shift, Doppler spread' |
| QCL-TypeC | Doppler shift, Average delay |
| QCL-TypeD | Spatial Rx parameter |

Each 'TCI-State' may include a parameter or configuring a QCL relation between one or two downlink reference signals and a DM-RS port of a PDSCH (or PDCCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s (0<s<40), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 11:
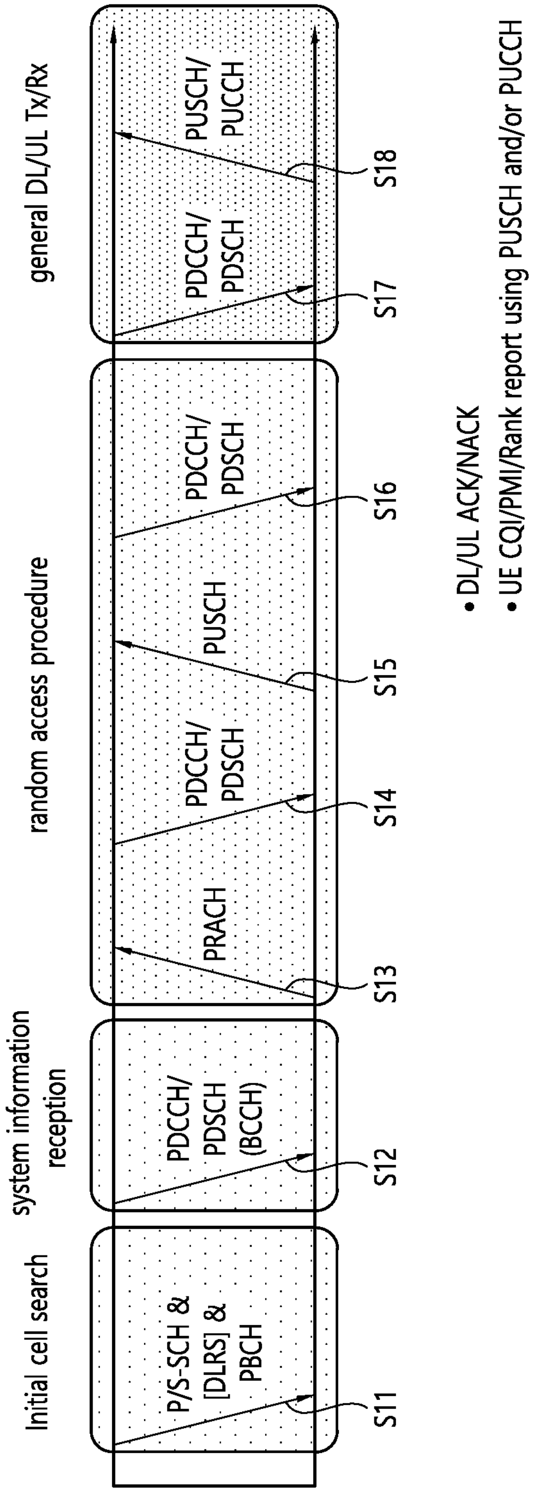
FIG. 11 illustrates physical channels and typical signal transmission.

FIG. 11 illustrates physical channels and typical signal transmission.

Referring to FIG. 11, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (NACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

In order to enable reasonable battery consumption when bandwidth adaptation (BA) is configured, only one uplink BWP and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires.

Hereinafter, an integrated access and backhaul link (IAB) will be described. Hereinafter, for convenience of description, a proposed method will be described based on a new RAT (NR) system. However, the range of the system to which the proposed method is applied is expandable to other systems such as 3GPP LTE/LTE-A systems in addition to the NR system.

One of the potential technologies aimed at enabling future cellular network deployment scenarios and applications is support for wireless backhaul and relay links, and it enables flexible and highly dense deployment of NR cells without the need to proportionally densify the transport network.

It is expected that greater bandwidth in NR compared to LTE will be available (e.g., mmWave spectrum) with the native deployment of massive MIMO or multi-beam systems, thus, occasions are created for the development and deployment of integrated access and backhaul links. This makes it easier of a dense network of self-backhauled NR cells in a more integrated manner by establishing multiple control and data channels/procedures defined to provide access or access to the UEs. Such systems are referred to as integrated access and backhaul links (IAB).

This disclosure defines the following.

AC (x): an access link between the node (x) and the UE(s).

BH (xy): a backhaul link between the node (x) and the node (y).

In this case, the node may mean a donor gNB (DgNB) or a relay node (RN). Here, the DgNB or the donor node may be a gNB that provides a function to support backhaul to IAB nodes.

When relay node 1 and relay node 2 exist, relay node 1 which is connected to relay node 2 by a backhaul link and relaying data transmitted and received to relay node 2 is called a parent node of relay node 2, and relay node 2 is called a child node of relay node 1.

Technical features described individually in one drawing in this specification may be implemented individually or simultaneously.

The following drawings were prepared to explain a specific example of the present specification. Since the names of specific devices or specific signals/messages/fields described in the drawings are provided as examples, the technical features of this specification are not limited to the specific names used in the drawings below.

Now, full duplex operation for NR will be described.

In 5G, new service types such as extended reality (XR), artificial intelligence-based service, and self-driving car are emerging. These services have characteristics that dynamically change traffic in both downlink (DL) and uplink (UL) directions, and require low latency for traffic (e.g., packets) to be transmitted. In 5G services, traffic will increase explosively to support these various new use cases.

Existing semi-static or dynamic TDD UL/DL configurations have limitations such as transmission time delay and interference between operators. The existing FDD method has limitations in terms of efficient frequency resource utilization in the DL/UL direction. Therefore, for low latency and efficient resource utilization in NR, the introduction of full duplex operation within a single carrier is being discussed.

Figure 12:
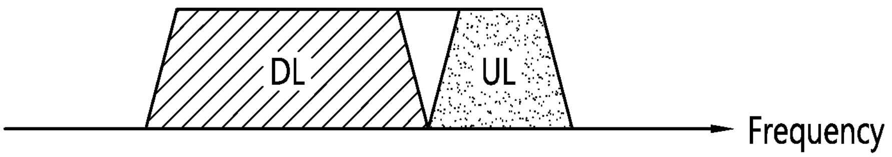
FIG. 12 shows examples of how to apply full duplex within an intra-carrier.
Figure 12:
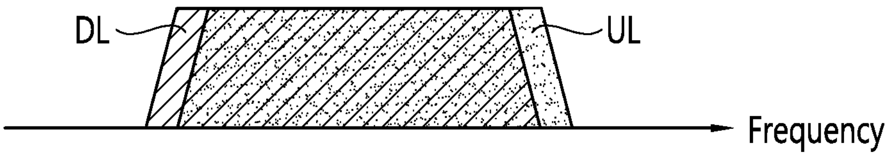

FIG. 12 shows examples of how to apply full duplex within an intra-carrier.

Referring to FIG. 12, the full duplex method includes subband-wise full duplex (hereinafter referred to as SB-FD) as shown in (a) of FIG. 12 and spectrum sharing full duplex (hereinafter referred to as SS-FD as shown in (b) of FIG. 12 may be considered.

In the case of SB-FD, DL and UL are transmitted and received through different frequency resources within the same carrier (e.g., carrier #0). That is, different frequency resources are used in DL and UL for the same time resource.

In the case of SS-FD, DL and UL are transmitted and received through frequency resources including the same frequency resource or overlapped frequency resources within the same carrier (e.g., carrier #0). That is, the same or overlapping frequency resources can be used in DL and UL for the same time resource.

This full-duplex (FD) operation can also be used in combination with the existing half-duplex (HD) operation. For example, among time resources used for existing half-duplex-based TDD operation, some time resources may be used for full duplex operation. SB-FD or SS-FD operations can be performed on time resources that perform full duplex operations.

Figure 13:
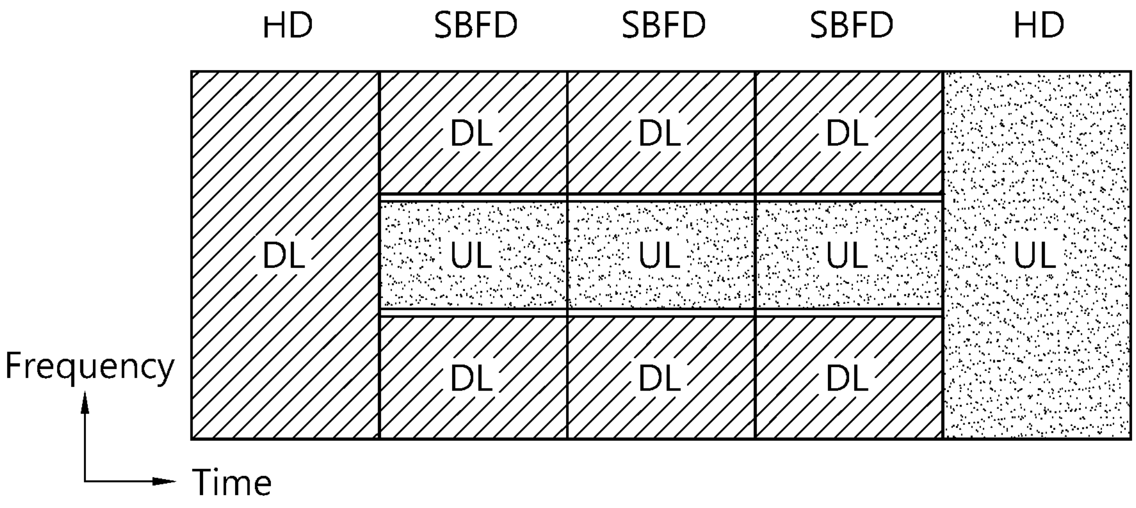
FIG. 13 shows an example in which a time resource operating in half duplex (HD) and a time resource operating in full duplex (FD) such as SB-FD or SS-FD exist together.
Figure 13:
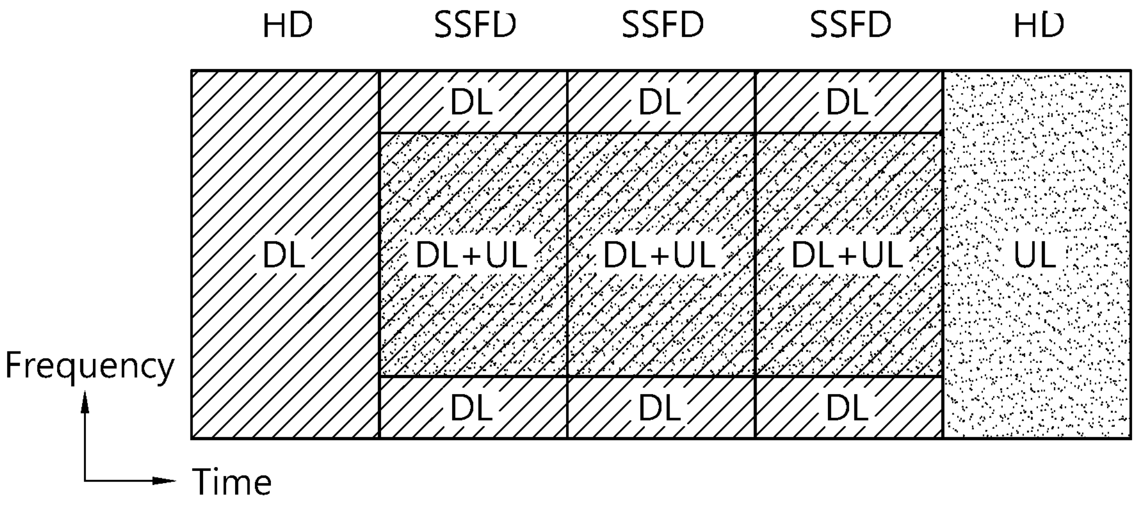

FIG. 13 shows an example in which a time resource operating in half duplex (HD) and a time resource operating in full duplex (FD) such as SB-FD or SS-FD exist together.

In (a) of FIG. 13, some time resources operating as SB-FD (=SBFD) are indicated as SBFD, and time resources operating as HD are indicated as HD. In (b) of FIG. 13, some time resources operating as SS-FD (=SSFD) are indicated as SSFD, and time resources operating as HD are indicated as HD. The unit of time resource may be, for example, a slot or symbol.

In time resources operating as SB-FD, some frequency resources are used as DL resources, and other frequency resources are used as UL resources. Between the DL frequency resource and the UL frequency resource, there may be a guard subband that is unused and empty for both DL and UL. Guard subbands may also be referred to by other terms, such as guard frequency resources or guard subcarrier(s).

In time resources operating with SS-FD, the entire frequency resource can be used for both DL and UL. Or, to reduce the impact of interference from other adjacent carriers (this may be referred to as ACI (adjacent carrier interference)), Some frequency resources at one or both ends of the carrier may not be used for DL and/or UL. That is, one or both ends of the carrier can be used as an unused guard band (guard subband) for both DL and UL. Alternatively, to reduce ACI on UL reception, one or both ends of the carrier may be used only for DL transmission.

In the present disclosure, in time resources operating in FD, among all frequency resources, frequency resources operating in DL are referred to as DL subbands, and frequency resources operating in UL are also referred to as UL subbands.

In the case of full duplex operation, both the base station and the UE can perform full duplex operation. That is, both the base station and the UE can simultaneously perform DL and UL transmission and reception using the same or different frequency resources in the same time resource.

Alternatively, only the base station can perform full duplex operation and the UE can perform half duplex operation. The base station can simultaneously perform transmission and reception of DL and UL using the same or different frequency resources in the same time resource, but the UE only performs DL reception or UL transmission in a specific time resource. In this case, the base station performs full duplex operation by performing DL transmission and UL reception with different UEs at the same time.

The content of the present disclosure is described assuming that the base station performs a full duplex operation, but the UE performs a half duplex operation. However, the content of the present disclosure can be applied even when both the base station and the UE perform full duplex operation.

Below, proposed is a method of changing BWP according to time resources and a method of applying switching time accordingly during intra-carrier full duplex operation.

When using SB-FD to simultaneously perform DL and UL operations on the same time resource, a guard subband can be placed between the DL and UL subbands to reduce self-interference (SI) and cross-link interference (CLI) from other DL subbands on the same carrier to the UL subband. When using SS-FD to perform DL and UL operations simultaneously on the same time resource, a guard subband can be placed at the edge of the carrier to reduce ACI from neighboring carriers.

This disclosure assumes a behavior where a cell (base station) performs both DL transmissions and UL receptions in the same time resource using FD methods such as SB-FD or SS-FD. More specifically, it is assumed that a half duplex (HD) operation is performed on the first time resource, and a full duplex (FD) operation is performed on the second time resource (this may be any time resource other than the first time resource).

In the first time resource for performing the HD operation, the DL operation or UL operation is performed on all frequency resources constituting the entire system bandwidth (or all frequency resources constituting the allocated BWP). Within the first time resource performing the HD operation, the network performs the DL operation through the 1-1 time resource and the UL operation through the 1-2 time resource. At this time, the 1-1 time resource and the 1-2 time resource do not overlap with each other.

For the second time resource that performs the FD operation, the network performs DL operation using all or part of the frequency resources constituting the system band of the cell (or all or part of the frequency resources constituting the allocated BWP) (first frequency resource), and performs UL operation through some frequency resources (second frequency resource) other than all or part of the frequency resources.

Figure 14:
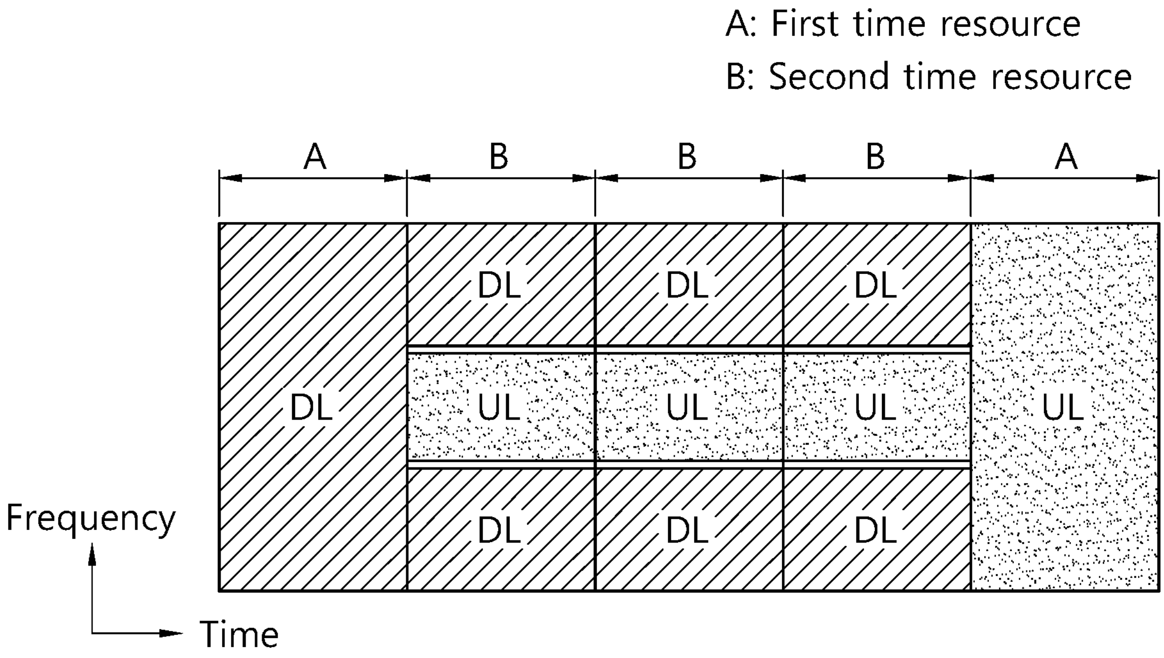
FIG. 14 shows examples of first time resource and second time resource, and examples of first frequency resource and second frequency resource.
Figure 14:
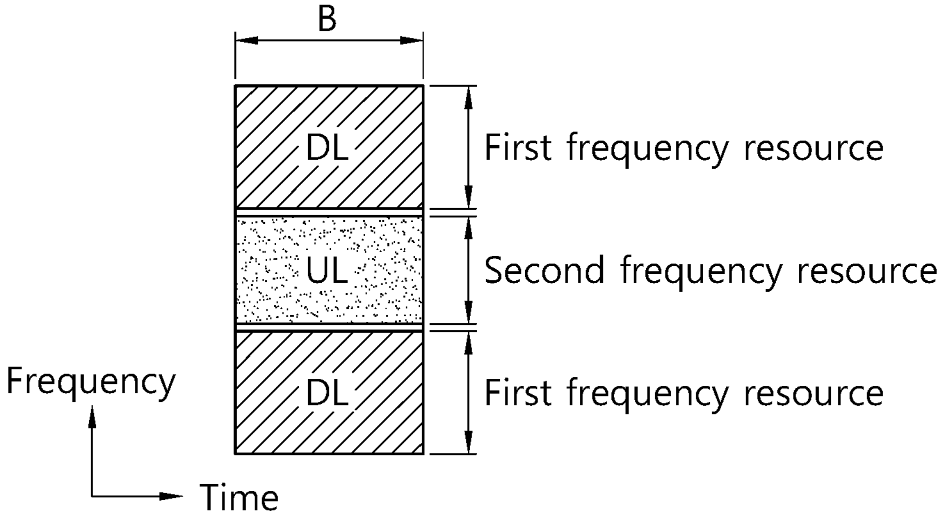

FIG. 14 shows examples of first time resource and second time resource, and examples of first frequency resource and second frequency resource.

Referring to (a) of FIG. 14, the first time resource (indicated by A) corresponds to a time resource operating in HD, and the second time resource (indicated by B) operates in FD (e.g., SB-FD). In the first time resource, the time resource indicated by DL corresponds to the 1-1 time resource, and the time resource indicated by UL corresponds to the 1-2 time resource.

(b) of FIG. 14 shows the second time resource, and the frequency resource operating as DL (indicated by DL) corresponds to the first frequency resource, and frequency resource operating in UL (indicated as UL) correspond to the second frequency resource.

Figure 15:
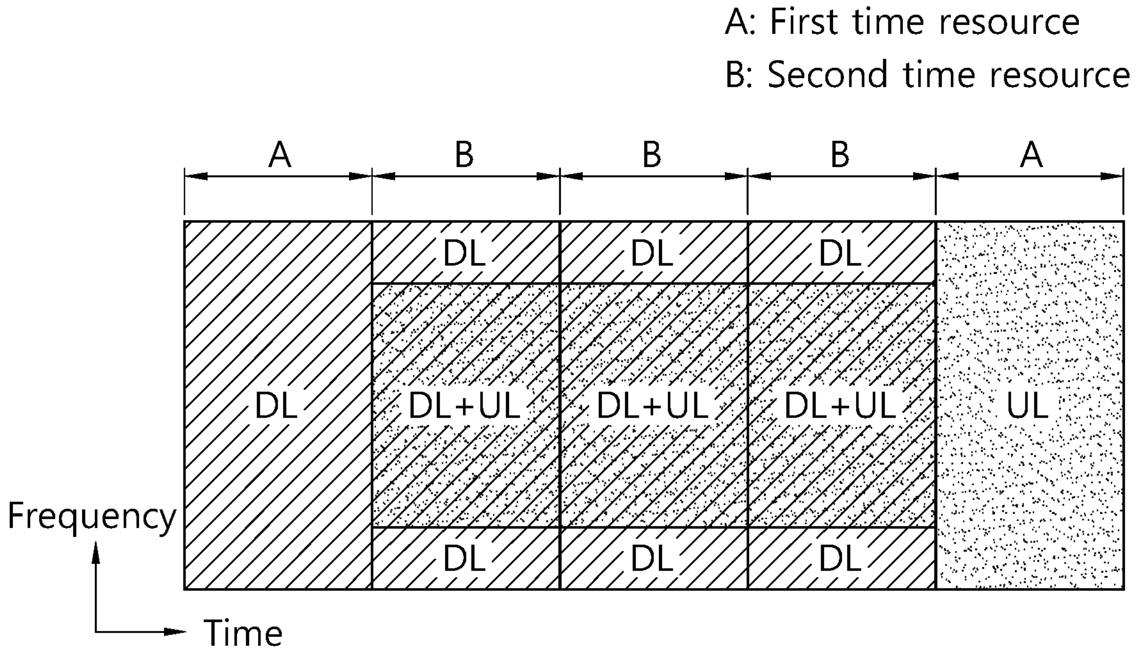
FIG. 15 shows another example of a first time resource and a second time resource, and another example of a first frequency resource and a second frequency resource.
Figure 15:
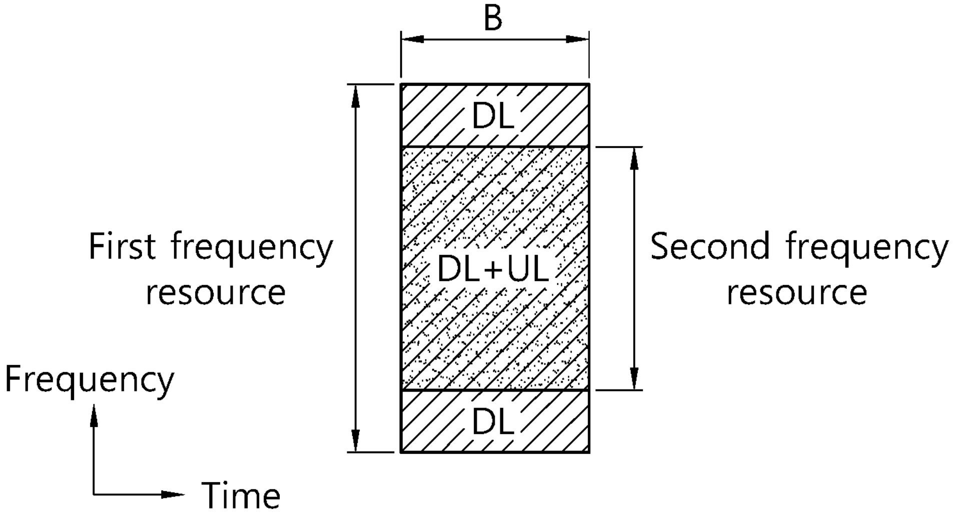

FIG. 15 shows another example of a first time resource and a second time resource, and another example of a first frequency resource and a second frequency resource.

Referring to (a) of FIG. 15, the first time resource (indicated by A) corresponds to a time resource operating in HD, and the second time resource (indicated by B) operates in FD (e.g., SS-FD). In the first time resource, the time resource indicated by DL corresponds to the 1-1 time resource, and the time resource indicated by UL corresponds to the 1-2 time resource.

(b) of FIG. 15 shows the second time resource, where the frequency resource operating in DL (indicated as DL) corresponds to the first frequency resource, and the frequency resource operating in UL corresponds to the second frequency resource. The frequency resource denoted as DL+UL is a frequency resource capable of both DL operation and UL operation and corresponds to both the first frequency resource and the second frequency resource.

More specifically, the first frequency resource and/or the second frequency resource may have all or some of the following characteristics.

1) When performing an SB-FD operation, the first frequency resource and the second frequency resource do not overlap with each other. This is to ensure that DL and UL resources are performed through different frequency resources. At this time, there may be frequency resources that do not correspond to the first and second frequency resource, and these frequency resources are called guard subbands or guard frequency resources. These guard frequency resources may be needed to reduce interference from DL transmission on UL reception. These guard frequency resources may be located between the first frequency resource and the second frequency resource.

2) When performing SS-FD operation, the first frequency resource and the second frequency resource may overlap. At this time, there may be frequency resources that do not correspond to the first and second frequency resources, and these frequency resources are called guard subbands or guard frequency resources. These guard frequency resources may be needed to reduce interference from DL transmission on adjacent carriers to UL reception and/or to reduce interference from DL transmission on UL reception on adjacent carriers.

3) When performing an SB-FD operation, the second frequency resource may be composed of continuous frequency resources, and the first frequency resource may be composed of discontinuous frequency resources. For example, the first frequency resource may be composed of a plurality (e.g., two) spaced apart frequency resource sets. At this time, each frequency resource set may be composed of consecutive frequency resources.

Alternatively, the first frequency resource may be composed of one frequency resource set, and at this time, the frequency resource set may be composed of continuous frequency resources, or may be composed of a plurality (for example, two) sets of continuous frequency resources.

That is, one or a plurality (for example, two) frequency resource set composed of consecutive frequency resources may be combined to form a first frequency resource. This is to reduce interference from DL transmission on adjacent carriers to UL resources by placing the second frequency resource used for UL at the center of the frequency resources constituting the cell.

Alternatively, the first frequency resource may be composed of continuous frequency resources, and the second frequency resource may be composed of discontinuous frequency resources. For example, the second frequency resource may be composed of a plurality (e.g., two) spaced apart frequency resource sets. At this time, each frequency resource set may be composed of consecutive frequency resources.

Alternatively, the second frequency resource may be composed of one frequency resource set, and in this case, the frequency resource set may be composed of consecutive frequency resources.

That is, one or more (for example, two) frequency resource sets composed of consecutive frequency resources can be combined to form a second frequency resource. This is to reduce interference from DL transmission on UL resources on adjacent carriers by placing the second frequency resource used for DL at the center of the frequency resources constituting the cell.

4) When performing SS-FD operation, the second frequency resource may be composed of some frequency resources of the first frequency resource. At this time, the second frequency resource may be configured to have fewer X physical resource blocks (PRBs) on one or both edges than the first frequency resource. This is to reduce interference from DL transmission on adjacent carriers to UL reception. This may be interpreted as the guard frequency resource being applied only to the second frequency resource and not to the first frequency resource.

The network may determine the 'first time resource' and 'second time resource', and the 'first frequency resource' and 'second frequency resource' as described above, and provide all or part of the corresponding information to the UE. The network performs DL transmission to the UE on these '1-1 time resources within the first time' and 'first frequency resources within the second time resource', and performs UL reception from the UE in '1-2 time resources within the first time resource' and 'second frequency resource within the second time resource'.

The UE may receive all or part of the information about the "first time resource" and the "second time resource" and the "first frequency resource" and the "second frequency resource" as described above from the network, and determine the location of the resource. The UE performs DL reception from the network on all or part of these "1-1 time resources within the first time resource" and "first frequency resources within the second time resource", and UL transmission to the network on "1-2 time resources within the first time resource" and "second frequency resources within the second time resource".

In this disclosure, proposed are a technique for changing BWP according to time resources and a method of applying switching time in the SB-FD and SS-FD environments described above.

In the following, the term network can be interpreted as being replaced with a base station (gNB) or CU/DU. Additionally, user equipment (UE) can be interpreted as being replaced by the MT of the JAB node.

A. Operation Method to Apply Different BWP According to Time Resources

As shown in FIG. 14 or FIG. 15, when the base station performs HD operation in the first time resource and the base station performs FD operation in the second time resource, the frequency resources available to the UE for transmitting and receiving in the first time resource and the frequency resources available for transmitting and receiving in the second time resource may be configured differently. When the cell performs an SB-FD operation in the second time resource, the UE can use all or part of the cell's total frequency resources for transmitting and receiving resources in the first time resource. On the other hand, in the second time resource, the UE can perform DL reception through all or part of the first frequency resource and UL transmission through all or part of the second frequency resource.

If the BWP of the UE consists of part/all of the first frequency resource and part/all of the second frequency resource, some of the frequency resources constituting the BWP in the second time resource are not used by the UE for transmission and reception.

For example, if the DL BWP of the UE includes a second frequency resource, when the UE performs DL reception on the second time resource, DL reception cannot be performed on the second frequency resource included in the DL BWP.

Conversely, if the UL BWP of the UE includes the first frequency resource, when the UE performs UL transmission in the second time resource, UL transmission cannot be performed in the first frequency resource included in the UL BWP. In this case, since resources that cannot actually perform transmission and reception are included in the UE's BWP, problems may occur in transmission and reception of various signals/channels.

To avoid the above problem, if a UE's DL BWP consists of only some/all of the first frequency resource and its UL BWP consists of only some/all of the second frequency resource, the UE's DL BWP/UL BWP will also be unnecessarily limited in the first time resource. In this case, it becomes difficult for the UE to achieve throughput gain, frequency diversity gain, etc. even though more frequency bands are actually available for transmission and reception in the first time resource.

Considering the above problems, it is necessary to apply different BWPs in the first time resource and the second time resource. According to the prior art, in order to apply a different BWP to the first time resource than to the second time resource, a DCI-based BWP switch method that dynamically indicates the BWP operated by the UE through DCI can be considered. In this case, the network can appropriately switch the BWP applied by the UE depending on whether the slot for transmitting and receiving data is the first time resource or the second time resource. However, in this case, while the location of the first time resource and the location of the second time resource are fixed semi-statically, there is a burden of frequently transmitting the BWP switching instruction.

Considering the above problems, in order to differently apply the frequency resources that the UE can use for transmission and reception depending on the time resource, it may be considered to configure the BWP applied by the UE differently depending on the time resource.

Figure 16:
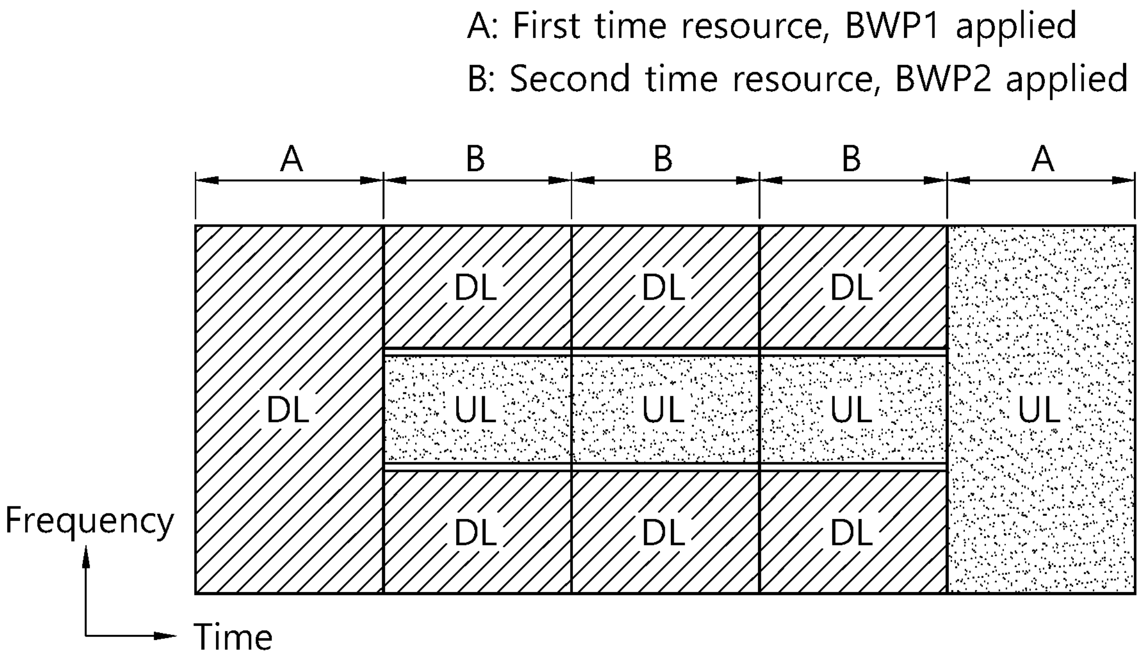
FIG. 16 illustrates a method of operation when the UE is configured with two BWPs, BWP 1 and BWP 2, from the network.

FIG. 16 illustrates an operation method when the UE receives two BWPs, BWP 1 and BWP 2, from the network.

Referring to FIG. 16, the UE may apply BWP 1 in the first time resource and BWP 2 in the second time resource. At this time, BWP 1 and BWP 2 are independent BWPs and may be composed of different frequency resources. At this time, BWP 1 and BWP 2 are independent BWPs and may be composed of different frequency resources. For example, BWP 1 may consist of all or part of all frequency resources constituting the cell, and BWP 2 may consist of the first frequency resource in the case of DL and all or part of the second frequency resource in the case of UL. These operations can be applied separately during DL operation and UL operation. That is, the UE can apply DL BWP 1 and UL BWP 1 in the first time resource, and DL BWP 2 and UL BWP 2 in the second time resource.

In more detail, the present disclosure proposes that the UE applies BWP differently depending on time resources through the following operations.

First, (1) the UE receives configuration information about the first time resource and/or the second time resource from the network. Through this, the UE determines the time resources constituting the first time resource and the time resources constituting the second time resource.

Additionally, (2) the UE receives configuration information for DL BWP and UL BWP from the network. Through this, the UE determines the DL BWP and UL BWP applied in the first time resource, and determines the DL BWP and UL BWP applied in the second time resource. At this time, in this disclosure, for convenience of explanation, the DL BWP and UL BWP applied in the first time resource are referred to as DL BWP 1 and UL BWP 1, respectively, and the DL BWP and UL BWP applied in the second time resource are referred to as DL BWP 2 and UL BWP 2, respectively.

Based on the information in (1) and (2) above, the UE may (3) in a specific slot/symbol, vary its operation BWP depending on whether the slot/symbol corresponds to the first time resource or the second time resource.

For example, i) when a specific slot/symbol belongs to the first time resource, the UE performs transmission and reception by applying DL BWP 1 during DL operation and UL BWP 1 during UL operation in the slot.

ii) If a specific slot/symbol belongs to the second time resource, the UE performs transmission and reception by applying DL BWP 2 during DL operation and UL BWP 2 during UL operation in the slot.

For the operation of (2) above, more specifically, the configuration information for the BWP that the UE receives from the network and the method for determining the BWP (DL BWP 1 and UL BWP 1) for the first time resource and the BWP (DL BWP 2 and UL BWP 2) for the second time resource from the configuration information may be as follows.

(a) The UE receives multiple DL BWPs and UL BWPs with different BWP identities from the network. In addition, from the network, a UE may be configured with a default BWP for full duplex (let's call it FD default BWP) in addition to the existing default BWP for a specific serving cell. The UE performs transmission and reception by applying the default BWP in the first time resource, and performs transmission and reception by applying the FD default BWP in the second time resource. That is, a total of two default BWPs are set, so that different BWPs can be applied as default BWPs in the first time resource and the second time resource. In this case, the FD default BWP setting method and the resulting default DL BWP and default UL BWP may be as follows.

The FD default BWP can be set by indicating one BWP ID corresponding to the FD default BWP among the plurality of BWPs set. In this case, the DL BWP and UL BWP with the corresponding BWP ID become the default DL BWP in DL resources and the default UL BWP in UL resources, respectively.

Alternatively, the UE may be configured with information about the UL BWP paired with the DL BWP from the network. At this time, if there is no separate pairing information, the DL BWP and the UL BWP with the same BWP ID can be interpreted as having a pairing relationship with each other. At this time, the FD default BWP can be set by indicating one BWP ID corresponding to the FD default BWP among the plurality of BWPs set. In this case, the DL BWP with the corresponding BWP ID becomes the default DL BWP, and the UL BWP in a pairing relationship with the corresponding DL BWP becomes the default UL BWP.

Alternatively, the FD default BWP can be set for DL and UL, respectively. That is, the BWP ID corresponding to the default DL BWP and the BWP ID corresponding to the default UL BWP can be set independently.

At this time, if the FD default BWP is not set separately, the UE may determine that the default BWP is applied as the FD default BWP.

Additionally, when BWP switching is indicated by DCI, the UE can change the operating BWP. Afterwards, when the inactivity timer expires, the UE moves to the default BWP and operates.

When the UE returns to the default BWP and operates, the UE operates with the default BWP in the first time resource and moves to the FD default BWP in the second time resource. The same can be applied to the RACH process of the UE. If there is no RACH configuration for the UE's operation BWP, the UE moves to the default BWP and performs the RACH operation. At this time, when operating in the default BWP, the UE operates as the default BWP in the first time resource and moves to the FD default BWP in the second time resource.

The method can also be interpreted as setting a default BWP for half-duplex (let's call it HD default BWP) in addition to the existing default BWP, so that the second time resource applies the existing default BWP and the first time resource applies the HD default BWP as the default BWP.

(b) When the UE receives the configuration information for each BWP from the network, the frequency resources comprising the BWP in the first time resource and the second time resource may be set differently. This means that for BWPs with the same BWP ID, on the first time resource, the BWP might be configured with PRB set 1, but on the second time resource, the BWP might be configured with PRB set 2. At this time, characteristically, PRB set 2 may be a subset of PRB set 1. In this case, the UE has one default BWP in a specific serving cell, but the frequency resources of the default BWP may be configured differently depending on time resources.

When applying this method, when the UE switches BWPs after being instructed to do so by the DCI, the frequency resources constituting those active BWPs may be configured/interpreted differently depending on the time resource in which the UE is operating (i.e., whether it is a first time resource or a second time resource).

(c) The UE can be configured with active BWP for full duplex (hereinafter referred to as FD active BWP) from the network through RRC/MAC, etc. This may mean an active BWP applied in the second time resource. That is, when the UE is configured with an FD active BWP from the network, the UE determines the BWP as its active BWP and applies it in the second time resource.

Additionally, these FD active BWP configurations may expire after a certain time. In this case, when the FD active BWP configuration expires, the UE operates by applying the default BWP in the second time resource.

Additionally, when the FD active BWP is set and the active BWP is applied as the FD active BWP in the second time resource, BWP switching may be indicated by DCI.

In this case, the UE may determine that BWP switching by DCI applies only to the first time resource. In this case, the UE may operate on the first time resource using the active BWP set by the corresponding BWP switching instruction, and on the second time resource ignoring the corresponding BWP instruction and operating using the FD active BWP. Afterwards, when the inactivity timer expires, the UE operates with the default BWP in both the first time resource and the second time resource. Alternatively, when the inactivity timer expires, the UE operates as the default BWP on the first time resource and as the FD active BWP on the second time resource.

Alternatively, the device may prioritize BWP switching by DCI over FD active BWP configurations. This means that if the UE is instructed by the DCI to apply BWP switching, it will operate with the corresponding active BWP on both the first time resource and the second time resource. When the inactivity timer expires, the device operates as the default BWP on both the first time resource and the second time resource. Alternatively, when the inactivity timer expires, the device operates as the default BWP on the first time resource and as the FD active BWP on the second time resource.

(d) The UE may apply the same default BWP on the first time resource and the second time resource, but the active BWP applied by the DCI indication may be different for different time resources. To this end, when the UE receives BWP switching indications from the network through DCI, it can be considered that two active BWPs are indicated. In this case, one of the two active BWPs is applied in the first time resource, and the other active BWP is applied in the second time resource.

Figure 17:
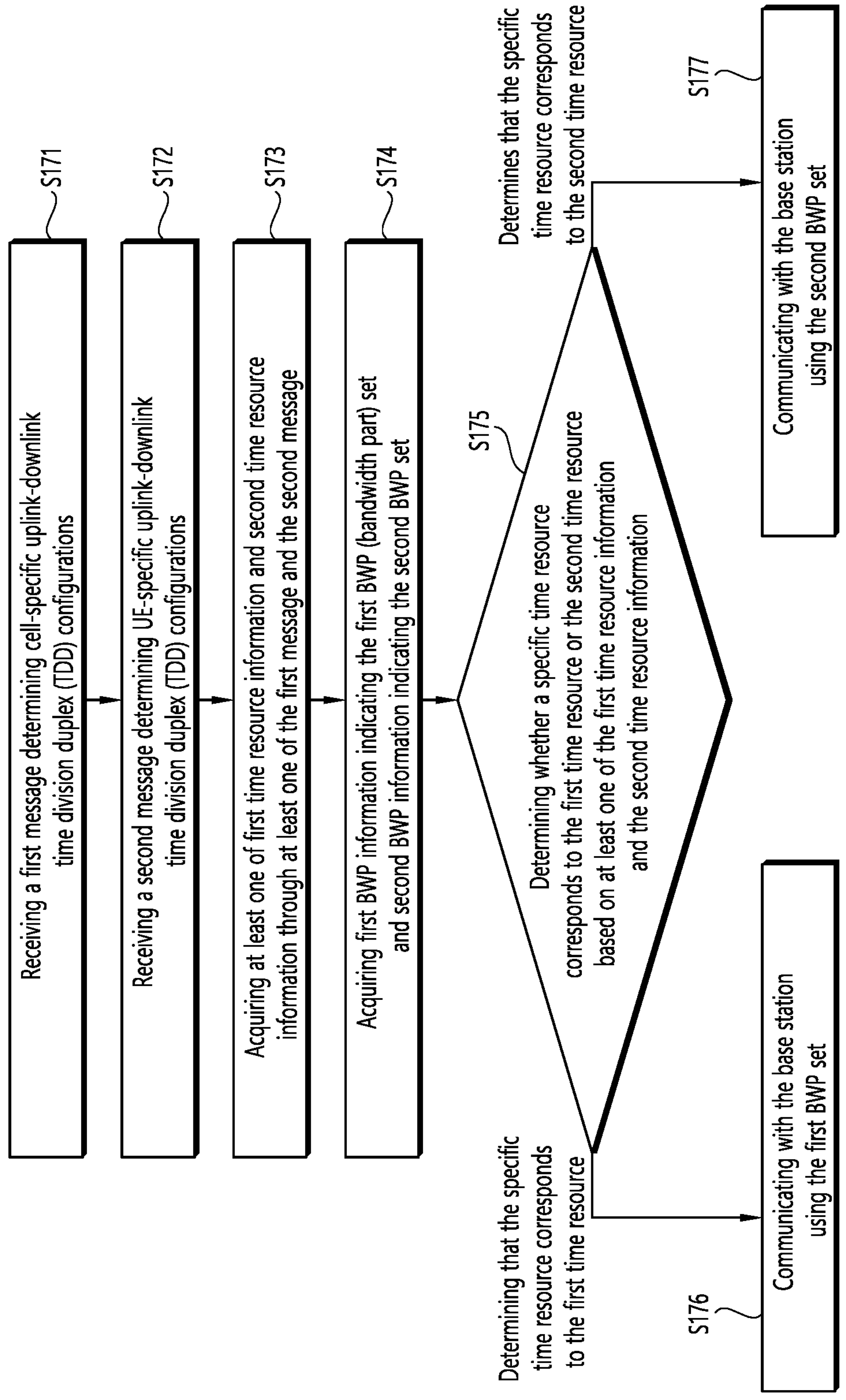
FIG. 17 illustrates a UE operation method according to one embodiment of the present disclosure.

FIG. 17 shows a UE operation method according to an embodiment of the present disclosure.

Referring to FIG. 17, the UE receives a first message determining cell-specific uplink-downlink time division duplex (TDD) configurations (S171). The first message may be, for example, TDD-UL-DL-ConfigCommon IE. The first message may include reference subcarrier spacing and pattern information.

The following table is an example of the first message.

TABLE

```
-- ASNISTART
-- TAG-TDD-UL-DL-CONFIGCOMMON-START
TDD-UL-DL-ConfigCommon ::=            SEQUENCE {
   referenceSubcarrierSpacing          SubcarrierSpacing,
   pattern1                              TDD-UL-DL-Pattern,
   pattern2                                TDD-UL-DL-Pattern
OPTIONAL, -- Need R
   ...
}
TDD-UL-DL-Pattern ::=                SEQUENCE {
   dl-UL-TransmissionPeriodicity        ENUMERATED {ms0p5, ms0p625, ms1,
ms1p25, ms2, ms2p5, ms5, ms10},
   nrofDownlinkSlots                     INTEGER (0..maxNrofSlots),
   nrofDownlinkSymbols                    INTEGER (0..maxNrofSymbols-1),
   nrofUplinkSlots                     INTEGER (0..maxNrofSlots),
   nrofUplinkSymbols                     INTEGER (0..maxNrofSymbols-1),
```

TABLE-continued

```
  ...,
  [[
  dl-UL-TransmissionPeriodicity-v1530              ENUMERATED {ms3, ms4}
OPTIONAL -- Need R
  ]]
}
-- TAG-TDD-UL-DL-CONFIGCOMMON-STOP
-- ASN1STOP
```

TDD-UL-DL-ConfigCommon IE may include reference subcarrier spacing and pattern information. The reference subcarrier spacing is used to determine a time domain boundary in an uplink-downlink pattern, and the pattern information includes a periodicity of a downlink-uplink pattern, the number of consecutive downlink slots at the beginning of the downlink-uplink pattern, the number of consecutive downlink symbols in the beginning of a slot following the last slot of the consecutive downlink slots, the number of consecutive uplink slots at the end of the downlink-uplink pattern, and the number of consecutive uplink symbols at the end of a slot preceding the first slot of the consecutive uplink slots.

The reference subcarrier spacing is used to determine a time domain boundary in an uplink-downlink pattern.

The pattern information may include the periodicity of the downlink-uplink pattern (dl-UL-TransmissionPeriodicity), the number of consecutive downlink slots at the beginning of the downlink-uplink pattern (nrofDownlinkSlots), and the number of consecutive downlink symbols in the beginning of the slot following the last downlink slot of the consecutive downlink slots (nrofDownlinkSymbols), the number of consecutive uplink slots at the end of the downlink-uplink pattern (nrofUplinkSlots), and the number of consecutive uplink symbols in the end of the slot preceding the first slot of the consecutive uplink slots (nrofUplinkSymbols).

The UE receives a second message determining UE-specific uplink-downlink time division duplex (TDD) configurations (S172). The second message may be, for example, TDD-UL-DL-ConfigDedicated IE. The following table is an example of the second message.

TABLE 6

```
-- ASNISTART
-- TAG-TDD-UL-DL-CONFIGDEDICATED-START
TDD-UL-DL-ConfigDedicated ::=                            SEQUENCE {
  slotSpecificConfigurationsToAddModList                          SEQUENCE (SIZE
(1..maxNrofSlots)) OF TDD-UL-DL-SlotConfig                  OPTIONAL, -- Need N
  slotSpecificConfigurations ToReleaseList                        SEQUENCE (SIZE
(1..maxNrofSlots)) OF TDD-UL-DL-SlotIndex                   OPTIONAL, -- Need N
  ...
}
TDD-UL-DL-ConfigDedicated-IAB-MT-v16xy ::=                     SEQUENCE {
  slotSpecificConfigurationsToAddModList-IAB-MT-v16xy            SEQUENCE (SIZE
(1..maxNrofSlots)) OF TDD-UL-DL-SlotConfig-IAB-MT-v16xy OPTIONAL, -- Need N
  slotSpecificConfigurationsToreleaseList-IAB-MT-v16xy          SEQUENCE (SIZE
(1..maxNrofSlots)) OF TDD-UL-DL-SlotIndex OPTIONAL, -- Need N
  ...
}
TDD-UL-DL-SlotConfig ::=                                 SEQUENCE {
  slotIndex                                                TDD-UL-DL-SlotIndex,
  symbols                                                    CHOICE {
    allDownlink                                                NULL,
    allUplink                                                  NULL,
    explicit                                                   SEQUENCE {
      nrofDownlinkSymbols                                             INTEGER
(1..maxNrofSymbols-1)                                           OPTIONAL, -- Need S
      nrofUplinkSymbols                                               INTEGER
(1..maxNrofSymbols-1)                                            OPTIONAL -- Need
S
    }
  }
    duplexType                                          ENUMERATED {HD, FD}
}
TDD-UL-DL-SlotConfig-IAB-MT-v16xy ::=                      SEQUENCE {
  slotIndex-r16                                              TDD-UL-DL-SlotIndex,
  symbols-IAB-MT-r16                                           CHOICE {
    allDownlink-r16                                               NULL,
    allUplink-r16                                                NULL,
    explicit-r16                                               SEQUENCE {
      nrofDownlinkSymbols-r16                                         INTEGER
(1..maxNrofSymbols-1)                                         OPTIONAL, -- Need FFS
      nrofUplinkSymbols-r16                                           INTEGER
(1..maxNrofSymbols-1)                                         OPTIONAL -- Need FFS
    },
    explicit-IAB-MT-r16                                         SEQUENCE {
      nrofDownlinkSymbols-r16                                         INTEGER
(1..maxNrofSymbols-1)                                         OPTIONAL, -- Need FFS
      nrofUplinkSymbols-r16                                           INTEGER
```

TABLE 6-continued

```
(1..maxNrofSymbols-1)                                OPTIONAL -- Need FFS
    }
  }
}
TDD-UL-DL-SlotIndex ::=                   INTEGER (0..maxNrofSlots-1)
-- TAG-TDD-UL-DL-CONFIGDEDICATED-STOP
-- ASN1STOP
```

TDD-UL-DL-ConfigDedicated IE may be a message that determines UE-specific uplink-downlink TDD configurations. TDD-UL-DL-ConfigDedicated IE may be an RRC message. The TDD-UL-DL-ConfigDedicated IE may include a slot index and information indicating whether each symbol in the slot identified by the slot index corresponds to a downlink symbol, an uplink symbol, or a flexible symbol. The 'duplexType' contained in TDD-UL-DL-ConfigDedicated IE's TDD-UL-DL-SlotConfig can indicate whether the slot pointed to by 'slotIndex' is an HD slot or FD slot. HD means that the slot corresponds to the first time resource, and FD means that the slot corresponds to the second time resource.

The second message may include a slotIndex and information indicating whether each symbol in the slot identified by the slotIndex corresponds to a downlink symbol, an uplink symbol, or a flexible symbol (e.g., allDownlink, allUplink, explicit, etc.).

The UE acquires at least one of first time resource information and second time resource information through at least one of the first message and the second message (S173).

The first time resource information may indicate a first time resource in which the base station is operating in half duplex (HD), and the second time resource information may indicate a second time resource in which the base station is operating in full duplex (FD).

When the UE receives only the first time resource information, the UE may determine that the remaining time resources not configured by the first time resource information correspond to the second time resources. Alternatively, when the UE receives only the second time resource information, the UE may determine that the remaining time resources not configured by the second time resource information correspond to the first time resource. When the UE receives both first time resource information and second time resource information, the first time resource can be set based on the first time resource information, and the second time resource can be set based on the second time resource information.

The UE receives/acquires first BWP information indicating the first BWP (bandwidth part) set and second BWP information indicating the second BWP set (S174). The first BWP set may include a first DL BWP and a first UL BWP, and the second BWP set may include a second DL BWP and a second UL BWP.

The UE determines whether a specific time resource corresponds to the first time resource or the second time resource based on at least one of the first time resource information and the second time resource information (S175).

If the UE determines that the specific time resource corresponds to the first time resource, it communicates with the base station using the first BWP set (S176).

If the UE determines that the specific time resource corresponds to the second time resource, it communicates with the base station using the second BWP set (S177).

According to this method, the UE can efficiently perform transmission and reception by applying different BWPs in the time resources in which the base station operates in HD and in the time resources in which the base station operates in FD. In addition, even if the base station switches between time resources operating in HD and time resources operating in FD, the base station does not need to inform the UE of the BWP change through DCI, and the UE can communicate with the base station using a predetermined set of BWPs, thereby reducing the signaling overhead between the base station and the UE and preventing unnecessary delays.

Figure 18:
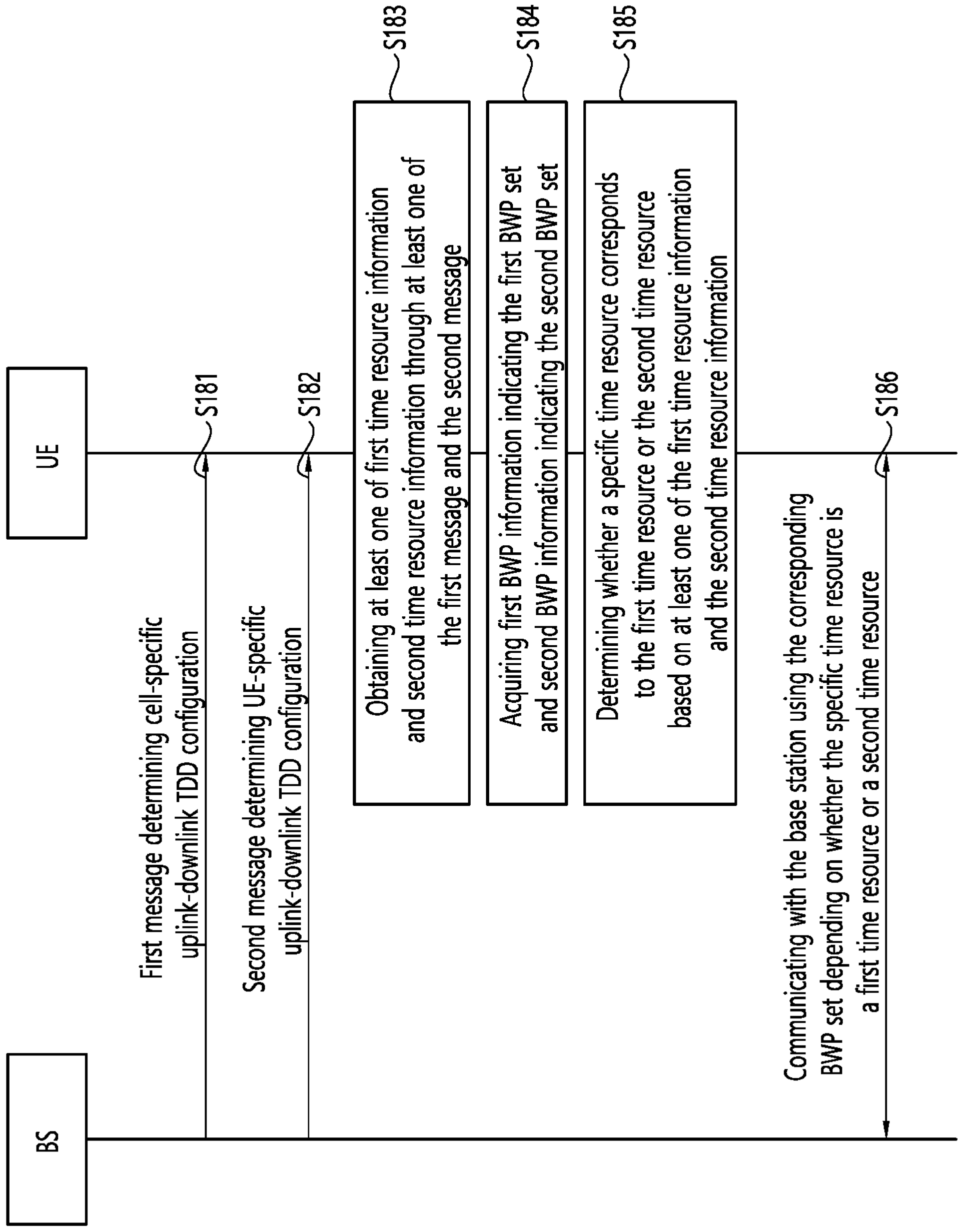
FIG. 18 illustrates the operation of a base station, a UE, and a signaling process between the base station and the UE according to one embodiment of the present disclosure.

FIG. 18 shows the operations of the base station and the UE and the signaling process between the base station and the UE according to an embodiment of the present disclosure.

Referring to FIG. 18, the base station transmits a first message determining cell-specific uplink-downlink TDD configuration to the UE (S181). The first message may be, for example, the TDD-UL-DL-ConfigCommon IE described above. The first message may include reference subcarrier spacing and pattern information.

The base station transmits a second message determining UE-specific uplink-downlink TDD configuration to the UE (S182). For example, the second message may be the TDD-UL-DL-ConfigDedicated IE described above.

The UE obtains at least one of first time resource information and second time resource information through at least one of the first message and the second message (S183).

Additionally, the UE acquires first BWP information indicating the first BWP set and second BWP information indicating the second BWP set (S184). The first BWP set includes a first DL BWP and a first UL BWP, and the second BWP set includes a second DL BWP and a second UL BWP.

The UE determines whether a specific time resource corresponds to the first time resource or the second time resource based on at least one of the first time resource information and the second time resource information (S185).

Depending on whether the specific time resource is a first time resource or a second time resource, the UE communicates with the base station using the corresponding BWP set (S186).

For example, if the specific time resource corresponds to the first time resource, communicate with the base station using the first BWP set, and if the specific time resource corresponds to the second time resource, communicate with the base station using the second BWP set.

B. Method for Applying Switching Time when Switching to BWP

As in Section A above, if the UE uses different BWPs in the first time resource and the second time resource to transmit and receive with the base station, it will change the BWP at the boundary of the first time resource and the second time resource. In this case, the center frequency may be different between the two BWPs, requiring the UE to change the operating center frequency, or different frequency filters may be applied depending on the BWP for filter adaptation to the operating frequency resource in SB-FD operation. In this case, switching time may be required to change the BWP in which the UE operates.

Considering this, when switching BWPs between the first time resource and the second time resource, it may be necessary to apply the switching time to prevent the UE from performing transmission and reception during the corresponding switching time. Below, proposed is a method of applying switching time when switching BWP at the boundary between the first time resource and the second time resource.

When a UE operates by switching BWPs at the boundary between the first time resource and the second time resource, the switching time required by the UE may be affected by the implementation of the UE and the frequency resource configuration of the operating BWP in the first time resource and the operating BWP in the second time resource. If the center frequencies of the two BWPs are configured differently, a larger switching time may be required than otherwise. Switching times may vary depending on whether the UE performs filter adaptation for both BWPs. Thus, the UE informs the network about the switching time it needs, and the network can set the appropriate switching time for the UE based on this information.

More specifically, the present disclosure proposes a method for a UE to apply a switching time at the boundary between a first time resource and a second time resource by performing the following operations.

First, (1) the UE reports its capability information related to BWP switching for FD operation to the network. Based on this information, (2) the network determines and transmits information about the switching time to be applied by the UE, and the UE receives this information from the network. (3) If the BWP applied by the first time resource and the BWP applied by the second time resource are different, the UE determines a certain time duration at the boundary of the first time resource and the second time resource as the switching time for changing the BWP. At this switching time, the UE does not expect transmission or reception with the network and may not perform transmission or reception.

In relation to operation (1) above, capability information related to BWP switching for FD operation reported by the UE to the network may be as follows. At this time, at least one of the following information may be reported.

(i) The UE can report the switching time value required when switching BWP between the first time duration and the second time duration. These switching time values may be reported in the form of the number of slots or symbols. Alternatively, it may be reported in the form of an index for the corresponding value among candidate values for a plurality of switching times.

Multiple such switching time values may be reported. For example, the UE may independently report the switching time required when the center frequencies of the BWP applied by the first time resource and the BWP applied by the second time resource are the same, and the switching time required when the center frequencies are not the same.

(b) The UE may report information on whether filter adaptation is performed when the UE performs BWP switching between the first time duration and the second time duration. Even if the center frequencies of the BWP applied by the first time resource and the BWP applied by the second time resource are the same, this information can help the network determine the switching time required by the UE, as the switching time may vary depending on whether the UE adapts the filter.

(c) In order to reduce the interference between DL frequency resources and UL frequency resources during SB-FD operation, a guard frequency resource is required to be located between the first frequency resource used as DL resource and the second frequency resource used as UL resource. In general, longer switching times are required for the UE to perform sharper filter adaptation. Therefore, the narrower the guard frequency resource, the larger the switching time that needs to be applied. Considering the correlation between the size (width) of the guard frequency resource and the switching time in SB-FD operation, information on the required switching time depending on the size of the guard frequency resource can be predefined. At this time, the UE can report the following information to the network.

The UE can report information about the size of the guard frequency resource it needs. The UE can also provide information about the required switching time by reporting information about the size of the guard frequency resource.

The UE can report information about the switching time it needs. The UE can also provide information about the size of the required guard frequency resources by reporting information about the switching time.

The UE may report information about a pair of the size of the guard frequency resources and switching time it requires (e.g., an index of the pair).

In relation to operation (2) above, information about the switching time that the UE receives from the network may be as follows.

(i) The UE can be configured with the switching time value required for BWP switching between the first time duration and the second time duration. This switching time value can be set in the form of a number of slots or symbols. Alternatively, it can be set in the form of an index for the corresponding value among candidate values for a plurality of switching times.

Additionally, multiple switching time values can be set. For example, the UE may receive independent a switching time that apply when the center frequencies of the BWP applied by the first time resource and the BWP applied by the second time resource are the same, and a switching time that apply when the center frequencies are not the same. At this time, the UE may determine the applicable switching time among the set switching times based on whether the center frequencies of the BWP applied in the first time resource and the BWP applied in the second time resource are aligned.

(ii) Considering the correlation between the size (width) of the guard frequency resource and the switching time in SB-FD operation, information on the required switching time according to the size of the guard frequency resource may be predefined. At this time, the device may receive the following information from the network.

The UE can receive information about the size of the guard frequency resource. The UE may determine the size of the switching time linked to the configured size of the guard frequency resource as the size of the switching time applied to the UE.

The UE can receive information about the size of the switching time. The UE may determine the size of the guard frequency resource linked to the size of the configured switching time as the size of the guard frequency resource applied to the UE.

The UE may be configured with information about a pair of the size of the guard frequency resource and the switching time (e.g., an index of the pair). From this value, the UE can determine the size of the guard frequency resource applied to the UE and the size of the switching time.

With respect to operation (3) above, the UE applies a switching time having a length (i.e., LS) set by the network at the boundary between the first time resource and the second time resource. At this time, it is proposed for the UE to determine the position of the switching time as follows.

(a) The UE determines that, at the time of switching between the first time resource and the second time resource (at the time of switching between the BWP applied in the first time resource and the BWP applied in the second time resource), the switching time is located at the beginning of the later time resource. For example, if slot #n and slot #n+1 are set as the first time resource and the second time resource, respectively, it is determined that a time resource equal to the size of LS from the beginning of slot #n+1 is used for switching time.

Conversely, the device determines that when switching between the first time resource and the second time resource (i.e., when switching between the BWP applied in the first time resource and the BWP applied in the second time resource), the switching time is located at the end of the preceding time resource. For example, if slot #n and slot #n+1 are set as the first time resource and the second time resource, respectively, it is determined that a time resource equal to the LS of the last part of slot #n is used for switching time.

(b) The UE determines that at the time of switching between the first time resource and the second time resource (i.e., at the time of switching between the BWP applied in the first time resource and the BWP applied in the second time resource), the switching time is located in the second time resource. For example, if slot #n and slot #n+1 are set as the first time resource and the second time resource, respectively, it is determined that from the beginning of slot #n+1, a time resource equal to LS is used for switching time. In another example, if slot #n and slot #n+1 are set as the second time resource and the first time resource, respectively, it is determined that a time resource equal to the LS of the last part of slot #n is used as the switching time.

Conversely, the device determines that the switching time is located in the first time resource when switching between the first and second time resources (i.e., when switching between a BWP applied in the first time resource and a BWP applied in the second time resource). For example, if slot #n and slot #n+1 are set as the second time resource and the first time resource, respectively, it is determined that from the beginning of slot #n+1, a time resource equal to LS is used for switching time. In another example, if slot #n and slot #n+1 are set as the first and second time resources, respectively, it is determined that a time resource equal to the LS of the last part of slot #n is used as the switching time.

In addition, the foregoing disclosure may only apply if the BWP applied in the first time resource is different from the BWP applied in the second time resource.

Figure 19:
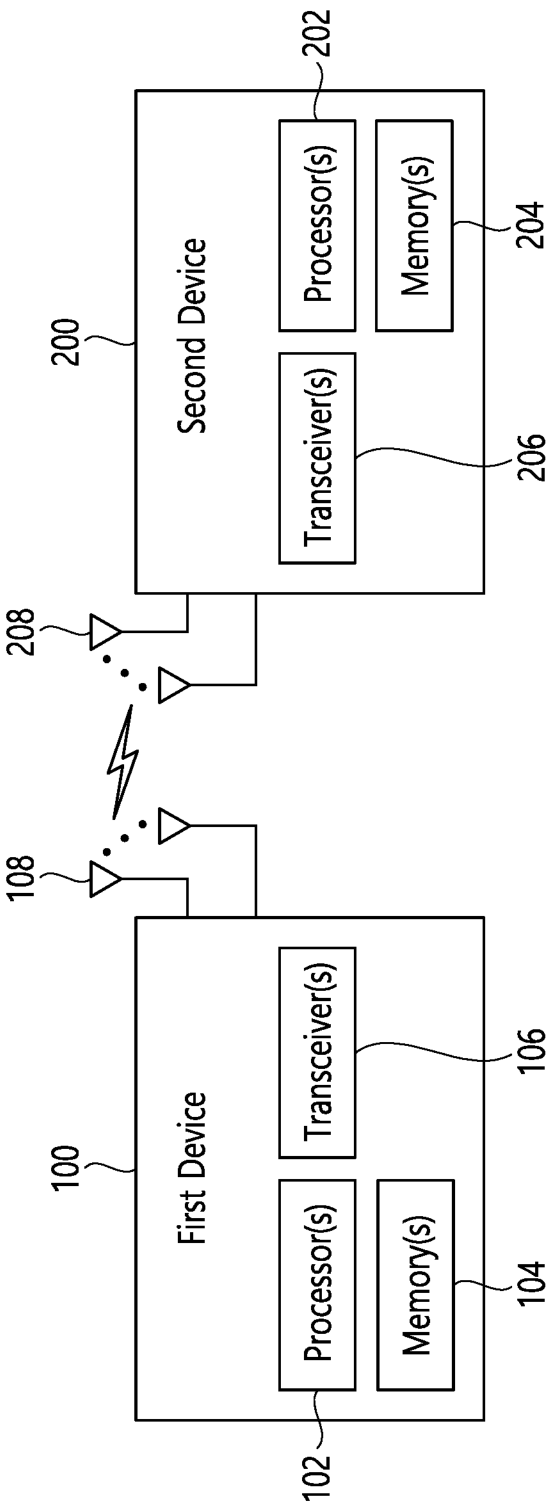
FIG. 19 illustrates a wireless device that can be applied the present specification.

FIG. 19 illustrates a wireless device applicable to the present specification.

Referring to FIG. 19, a first wireless device 100 and a second wireless device 200 may transmit radio signals through a variety of RATs (e.g., LTE and NR).

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processory 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present specification, the wireless device may represent a communication modem/circuit/chip.

The first wireless device 100 may be a UE. The processor 102 of the UE performs receiving a first message determining a cell-specific uplink-downlink TDD configuration, receiving a second message determining a UE-specific uplink-downlink TDD configuration, receiving, via at least one of the first message and the second message, at least one first time resource information and second time resource information, receiving first BWP information informing a first BWP set and second BWP information informing a second BWP set, determining, based on at least one of the first time resource information and the second time resource information, whether a specific time resource corresponds to the first time resource or the second time resource, based on the specific time resource corresponding to the first time resource, communicating with the base station using the first BWP set, and based on the specific time resource corresponding to the second time resource, communicating with the base station using the second BWP set.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 206 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present specification, the wireless device may represent a communication modem/circuit/chip.

The second wireless device 200 may be a base station. The processor 202 of the base station performs transmitting a first message determining a cell-specific uplink-downlink TDD configuration and a second message determining a UE-specific uplink-downlink TDD configuration to the UE, transmitting, via at least one of the first message and the second message, first time resource information and second time resource information, the first time resource information informing a first time resource for which a base station is operating in half duplex (HD) and the second time resource information informing a second time resource for which the base station is operating in full duplex (FD). And processor 202 of the base station performs transmitting first bandwidth part (BWP) information informing a first BWP set and second BWP information informing a second BWP set, the first BWP set including a first DL BWP and a first UL BWP, and the second BWP set including a second DL BWP and a second UL BWP, based on a specific time resource corresponding to the first time resource, communicating with a user equipment (UE) using the first BWP set, and based on the specific time resource corresponding to the second time resource, communicating with the UE using the second BWP set.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The one or more processors 102 and 202 may be implemented with at least one computer readable medium (CRM) including instructions to be executed by at least one processor.

That is, at least one computer readable medium (CRM) having an instruction to be executed by at least one processor to perform operations includes: receiving a first message determining a cell-specific uplink-downlink time division duplex (TDD) configuration, the first message including a reference subcarrier spacing and pattern information, the reference subcarrier spacing being used to determine a time domain boundary in an uplink-downlink pattern, and the pattern information informing a periodicity of a downlink-uplink pattern, number of consecutive downlink slots at a beginning of the downlink-uplink pattern, number of consecutive downlink symbols in a beginning of a slot following a last slot of the consecutive downlink slots, number of consecutive uplink slots at an end of the downlink-uplink pattern, and number of consecutive uplink symbols at an end of a slot preceding a first slot of the consecutive uplink slots, receiving a second message determining a UE-specific uplink-downlink time division duplex (TDD) configuration, the second message including a slot index and information informing whether each symbol in a slot identified by the slot index corresponds to a downlink symbol, an uplink symbol, or a flexible symbol, receiving, via at least one of the first message and the second message, at least one of first time resource information and second time resource information, the first time resource information informing a first time resource for which a base station is operating in half duplex (HD) and the second time resource information informing a second time resource for which the base station is operating in full duplex (FD), receiving first bandwidth part (BWP) information informing a first BWP set and second BWP information informing a second BWP set, the first BWP set including a first downlink (DL) BWP and a first uplink (UL) BWP, and the second BWP set including a second DL BWP and a second UL BWP, determining, based on at least one of the first time resource information and the second time resource information, whether a specific time resource corresponds to the first time resource or the second time resource, based on the specific time resource corresponding to the first time resource, communicating with the base station using the first BWP set, and based on the specific time resource corresponding to the second time resource, communicating with the base station using the second BWP set.

The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
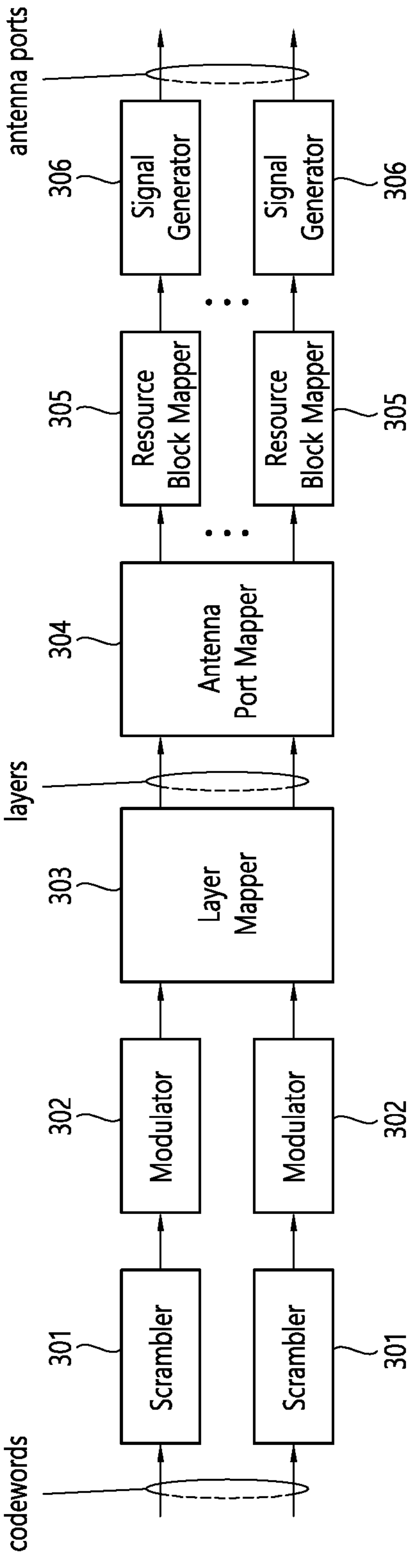
FIG. 20 shows an example of a signal processing module structure.

FIG. 20 shows an example of a structure of a signal processing module. Herein, signal processing may be performed in the processors 102 and 202 of FIG. 19.

Referring to FIG. 20, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 21:
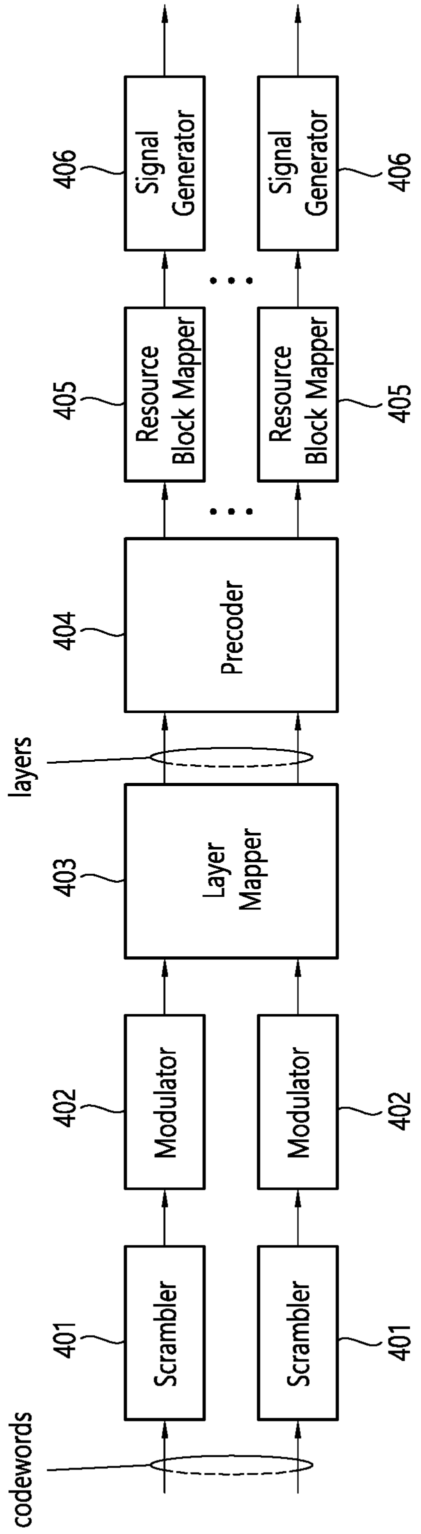
FIG. 21 shows another example of the structure of a signal processing module in a transmission device.

FIG. 21 shows another example of a structure of a signal processing module in a transmitting device. Herein, signal processing may be performed in a processor of a UE/BS, such as the processors 102 and 202 of FIG. 19.

Referring to FIG. 21, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N× M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 22:
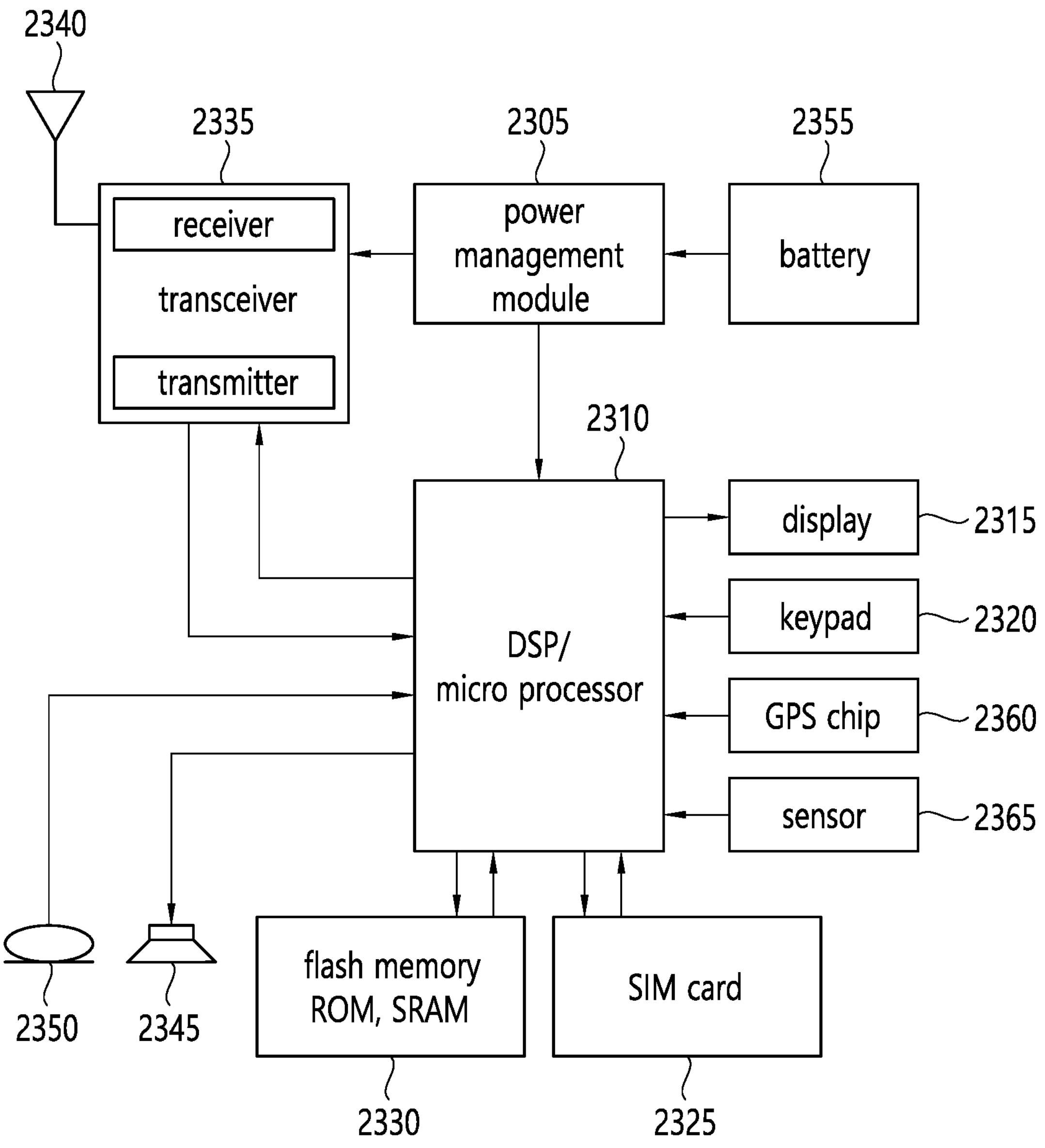
FIG. 22 shows an example of a wireless communication device according to an implementation example of the present disclosure.

FIG. 22 illustrates an example of a wireless communication device according to an implementation example of the present disclosure.

Referring to FIG. 22, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 22 may be the processors 102 and 202 in FIG. 19.

The memory 2330 is connected to the processor 2310 and stores information related to operations of the processor. The memory may be located inside or outside the processor and connected to the processor through various techniques such as wired connection and wireless connection. The memory 2330 in FIG. 22 may be the memories 104 and 204 in FIG. 19.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 22 may be the transceivers 106 and 206 in FIG. 19.

Although not shown in FIG. 22, various components such as a camera and a universal serial bus (USB) port may be additionally included in the UE. For example, the camera may be connected to the processor 2310.

FIG. 22 is an example of implementation with respect to the UE and implementation examples of the present disclosure are not limited thereto. The UE need not essentially include all the components shown in FIG. 22. That is, some of the components, for example, the keypad 2320, the GPS chip 2360, the sensor 2365 and the SIM card 2325 may not be essential components. In this case, they may not be included in the UE.

Figure 23:
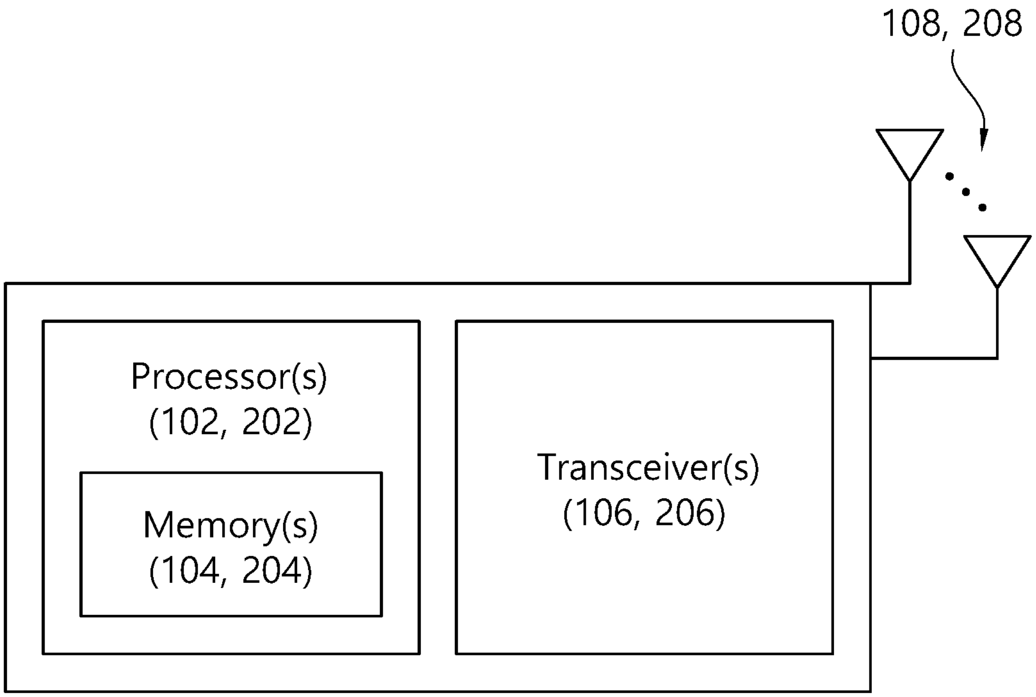
FIG. 23 shows another example of a wireless device.

FIG. 23 shows another example of a wireless device.

Referring to FIG. 23, the wireless device may include one or more processors 102 and 202, one or more memories 104 and 204, one or more transceivers 106 and 206 and one or more antennas 108 and 208.

The example of the wireless device described in FIG. 23 is different from the example of the wireless described in FIG. 19 in that the processors 102 and 202 and the memories 104 and 204 are separated in FIG. 19 whereas the memories 104 and 204 are included in the processors 102 and 202 in the example of FIG. 23. That is, the processor and the memory may constitute one chipset.

Figure 24:
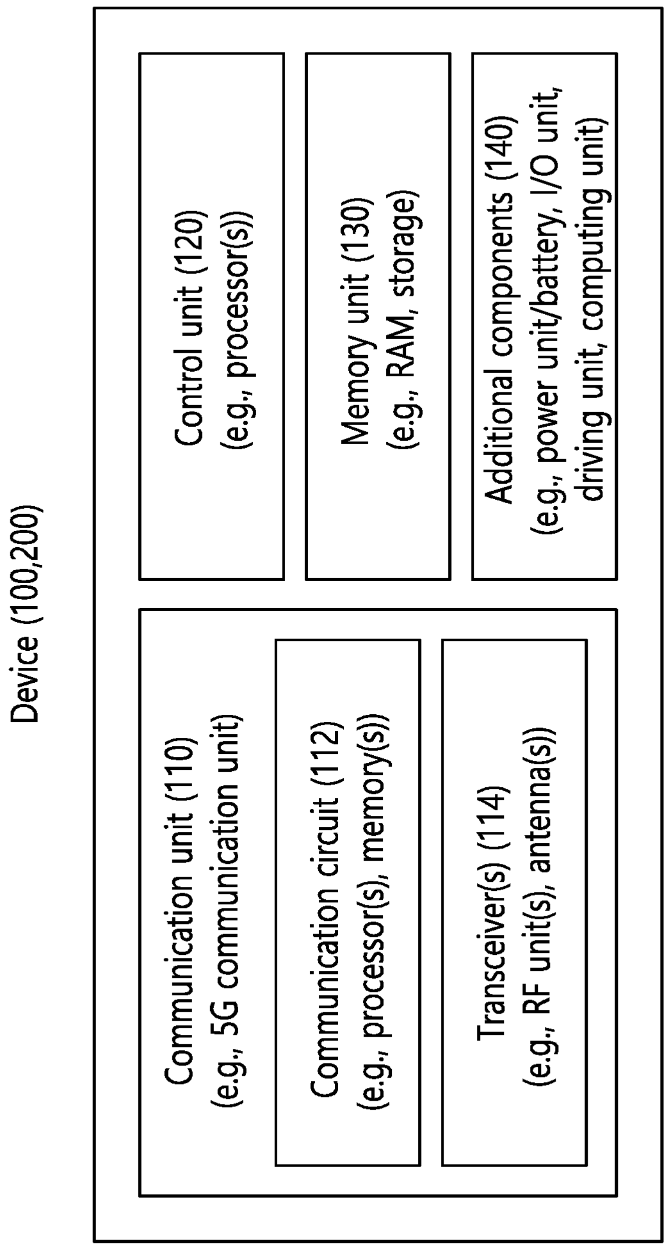
FIG. 24 shows another example of a wireless device applied to the present specification.

FIG. 24 shows another example of a wireless device applied to the present specification. The wireless device may be implemented in various forms according to a use-case/service.

Referring to FIG. 24, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot 100*a* of FIG. 26, the vehicles 100*b*-1, 100*b*-2 of FIG. 26, the XR device 100*c* of FIG. 26, the hand-held device 100*d* of FIG. 26, the home appliance 100*e* of FIG. 26, the IoT device 100*f* of FIG. 26, a digital broadcast UE, a hologram device, a public safety device, an MTC device, a medicine device, a fintech device (or a finance device), a security device, a climate/environment device, the AI server/device 400 of FIG. 26, the BSs 200 of FIG. 26, a network node, etc. The wireless device may be used in a mobile or fixed place according to a use-example/service.

In FIG. 24, various elements, components, units/parts, and/or modules within the wireless devices 100 and 200 may be entirely interconnected through a wired interface, or at least a portion may be wirelessly connected through the communication unit 110. For example, within the wireless devices 100 and 200, the control unit 120 and the communication unit 110 may be connected by wire, and the control unit 120 and the first unit (e.g., 130 and 140) may be connected through the communication unit 110. Additionally, each element, component, unit/part, and/or module within the wireless devices 100 and 200 may further include one or more elements. For example, the control unit 120 may be comprised of one or more processor sets. For example, the control unit 120 may be comprised of a communication control processor, an application processor, an electronic control unit (ECU), a graphics processing processor, and a memory control processor. As another example, the memory unit 130 includes random access memory (RAM), dynamic RAM (DRAM), read only memory (ROM), flash memory, volatile memory, and non-volatile memory. volatile memory) and/or a combination thereof.

Figure 25:
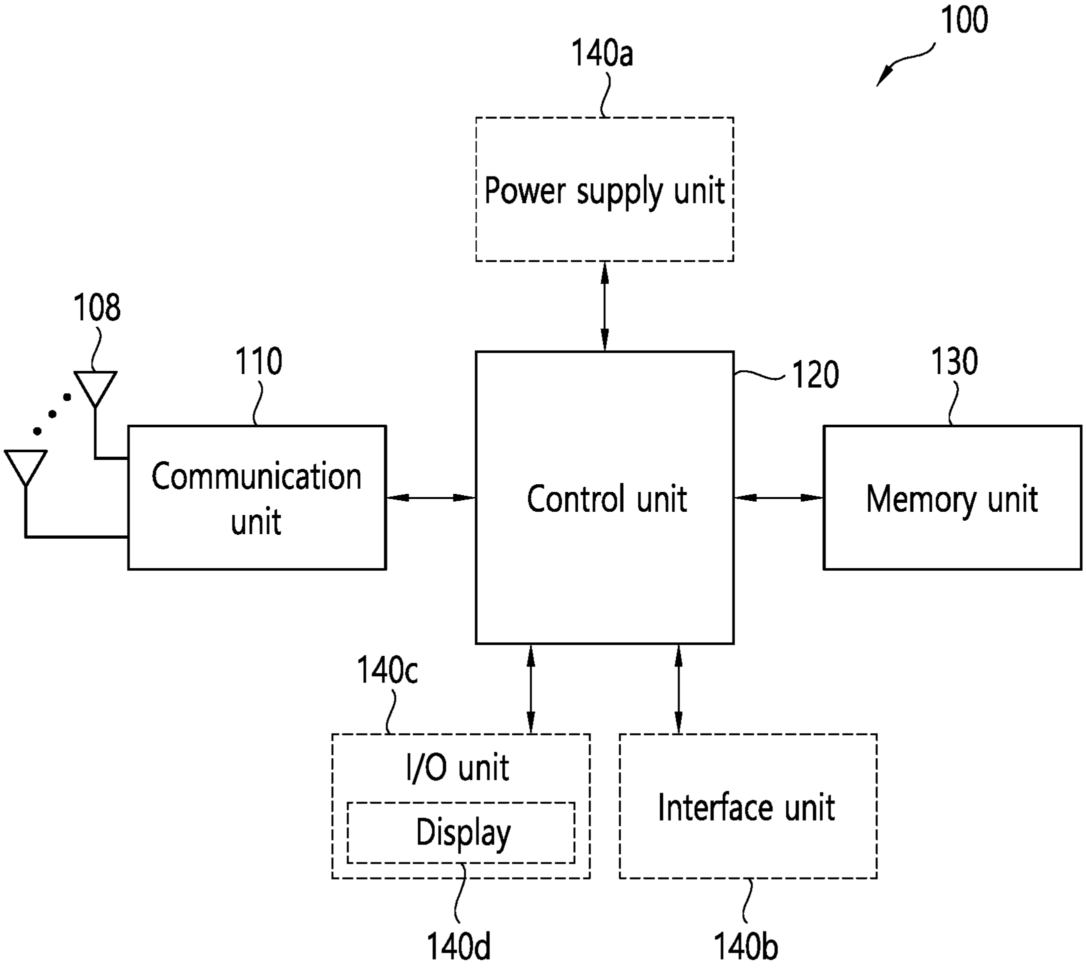
FIG. 25 illustrates a hand-held device applied to the present specification.

FIG. 25 illustrates a hand-held device applied to the present specification. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* respective correspond to the blocks 110 to 130/140 of FIG. 24.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

For example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 26:
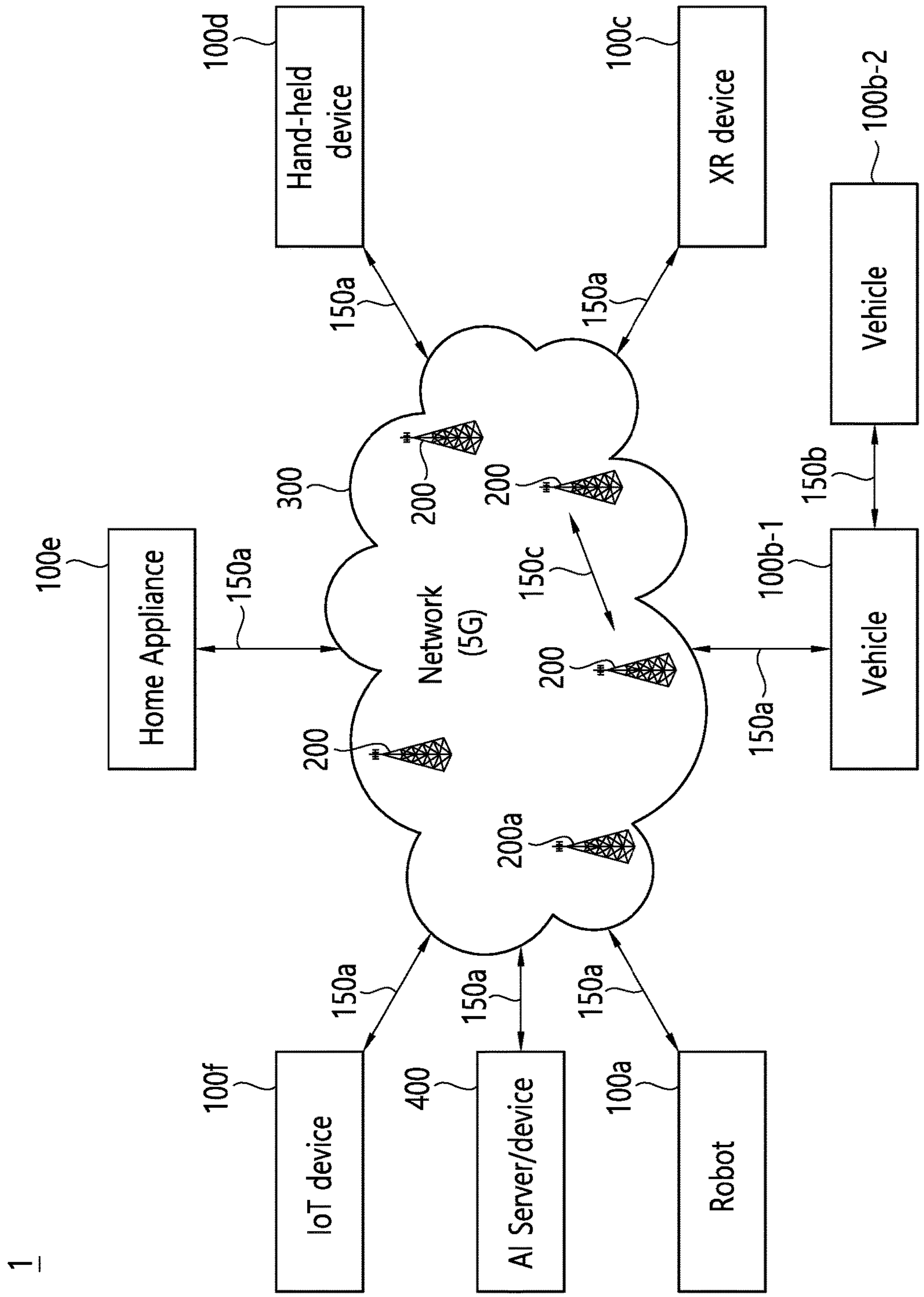
FIG. 26 illustrates the communication system 1 applied to this specification.

FIG. 26 illustrates a communication system 1 applied to the present specification.

Referring to FIG. 26, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication(e.g. relay, Integrated Access Backhaul(IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Meanwhile, the NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 7. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 7

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 8 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 8

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method comprising:

performing, by a user equipment (UE), a random access procedure with a base station in at least one of subband full duplex (SBFD) symbols and non-SBFD symbols, wherein the random access procedure includes:

transmitting, by the UE, a preamble on a physical random access channel (PRACH) to the base station, receiving, by the UE, a random access response (RAR) from the base station, performing, by the UE, a scheduled transmission to the base station using scheduling information in the RAR, and receiving, by the UE, a contention resolution message from the base station;

reporting, by the UE, switching time information to the base station, wherein the switching time information informs the base station of a required switching time required for the UE to switch between an SBFD symbol and a non-SBFD symbol; and receiving, by the UE, configuration information from the base station, wherein the configuration information informs the UE of a configured switching time, wherein the UE skips transmission and reception with the base station during the configured switching time, and wherein the configured switching time is configured in a form of an index for a specific value among candidate values for a plurality of switching times.

2. The method of claim 1, wherein the configured switching time is located in the non-SBFD symbol.

3. The method of claim 1, further comprising:

receiving a first message determining a cell-specific uplink-downlink time division duplex (TDD) configuration, wherein the first message includes a reference subcarrier spacing and pattern information, wherein the reference subcarrier spacing is used to determine a time domain boundary in an uplink-downlink pattern, and wherein the pattern information includes a periodicity of a downlink-uplink pattern, number of consecutive downlink slots at a beginning of the downlink-uplink pattern, number of consecutive downlink symbols in a beginning of a slot following a last slot of the consecutive downlink slots, number of consecutive uplink slots at an end of the downlink-uplink pattern, and number of consecutive uplink symbols at an end of a slot preceding a first slot of the consecutive uplink slots, receiving a second message determining a UE-specific uplink-downlink time division duplex (TDD) configuration, wherein the second message includes a slot index and information informing whether each symbol in a slot identified by the slot index corresponds to a downlink symbol, an uplink symbol, or a flexible symbol, and receiving, via at least one of the first message and the second message, first time resource information and second time resource information, wherein the first time resource information informs a first time resource for which a base station is operating in half duplex (HD) and the second time resource information informs a second time resource for which the base station is operating in SBFD.

4. The method of claim 3, wherein the first message and the second message are radio resource control (RRC) messages.

5. A user equipment (UE) comprising:

at least one transceiver;

at least one memory; and at least one processor operably connectable to the at least one transceiver and the at least one memory, wherein the at least one memory stores instructions that, based on being executed by the at least one processor, cause the at least one processor to perform operations comprising:

performing a random access procedure with a base station in at least one of subband full duplex (SBFD) symbols and non-SBFD symbols, wherein the random access procedure includes:

transmitting a preamble on a physical random access channel (PRACH) to the base station, receiving a random access response (RAR) from the base station, performing a scheduled transmission to the base station using scheduling information in the RAR, and receiving a contention resolution message from the base station;

reporting switching time information to the base station, wherein the switching time information informs the base station of a required switching time required for the UE to switch between an SBFD symbol and a non-SBFD symbol; and receiving configuration information from the base station, wherein the configuration information informs the UE of a configured switching time, wherein the UE skips transmission and reception with the base station during the configured switching time, and wherein the configured switching time is configured in a form of an index for a specific value among candidate values for a plurality of switching times.

6. The UE of claim 5, wherein the configured switching time is located in the non-SBFD symbol.

7. The UE of claim 5, the operations further comprising:

receiving a first message determining a cell-specific uplink-downlink time division duplex (TDD) configuration, wherein the first message includes a reference subcarrier spacing and pattern information, wherein the reference subcarrier spacing is used to determine a time domain boundary in an uplink-downlink pattern, and wherein the pattern information includes a periodicity of a downlink-uplink pattern, number of consecutive downlink slots at a beginning of the downlink-uplink pattern, number of consecutive downlink symbols in a beginning of a slot following a last slot of the consecutive downlink slots, number of consecutive uplink slots at an end of the downlink-uplink pattern, and number of consecutive uplink symbols at an end of a slot preceding a first slot of the consecutive uplink slots, receiving a second message determining a UE-specific uplink-downlink time division duplex (TDD) configuration, wherein the second message includes a slot index and information informing whether each symbol in a slot identified by the slot index corresponds to a downlink symbol, an uplink symbol, or a flexible symbol, and receiving, via at least one of the first message and the second message, first time resource information and second time resource information, wherein the first time resource information informs a first time resource for which a base station is operating in half duplex (HD) and the second time resource information informs a second time resource for which the base station is operating in SBFD.

8. The UE of claim 7, wherein the first message and the second message are radio resource control (RRC) messages.

* * * * *